United States Patent
Li et al.

(10) Patent No.: US 11,259,315 B2
(45) Date of Patent: Feb. 22, 2022

(54) DATA TRANSMISSION METHOD, NETWORK DEVICE, AND TERMINAL DEVICE

(71) Applicant: Huawei Technologies Co., Ltd., Guangdong (CN)

(72) Inventors: Chaojun Li, Beijing (CN); Sha Ma, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 207 days.

(21) Appl. No.: 16/401,969

(22) Filed: May 2, 2019

(65) Prior Publication Data

US 2019/0261386 A1 Aug. 22, 2019

Related U.S. Application Data

(63) Continuation of application No. PCT/CN2016/104461, filed on Nov. 3, 2016.

(51) Int. Cl.
*H04W 72/12* (2009.01)
*H04L 1/00* (2006.01)
(Continued)

(52) U.S. Cl.
CPC ......... *H04W 72/121* (2013.01); *H04L 1/0004* (2013.01); *H04W 72/042* (2013.01);
(Continued)

(58) Field of Classification Search
None
See application file for complete search history.

(56) References Cited

U.S. PATENT DOCUMENTS 9,088,978 B2 * 7/2015 Frenne ................. H04L 5/0091
10,849,114 B2 * 11/2020 Yamada ............... H04B 7/0626
(Continued)

FOREIGN PATENT DOCUMENTS

| CN | 101500312 A | 8/2009 |
|----|-------------|--------|
| CN | 101645762 A | 2/2010 |

(Continued)

OTHER PUBLICATIONS

All about 3G Evolution, First Publication, Maruzen Co., Ltd., Nov. 30, 2009, p. 291 293.
(Continued)

*Primary Examiner* — Diane L Lo
(74) *Attorney, Agent, or Firm* — Womble Bond Dickinson (US) LLP

(57) ABSTRACT

Embodiments of the present disclosure provide a data transmission method, a network device, and a terminal device. A network device configures N groups of scheduling information based on a requirement of a terminal device group, configures at least one piece of downlink data based on M groups of scheduling information in the N groups of scheduling information, and sends first downlink data to a first terminal device in a first transmission time unit. Correspondingly, the first terminal device determines the N groups of scheduling information, and detects the first downlink data in the first transmission time unit based on the N groups of scheduling information. In the process, the first downlink data can be successfully transmitted through a plurality of transmissions and one successful detection, thereby implementing highly reliable data transmission. In addition, not only low reliability of PDCCH dynamic scheduling is avoided without introducing a large quantity of control overheads, but also link adaptation can be obtained.

17 Claims, 12 Drawing Sheets

(51) Int. Cl.
*H04W 80/08* (2009.01)
*H04W 72/04* (2009.01)

(52) U.S. Cl.
CPC ....... *H04W 72/1273* (2013.01); *H04W 80/08* (2013.01); *H04W 72/1242* (2013.01); *H04W 72/1289* (2013.01)

(56) References Cited

U.S. PATENT DOCUMENTS

| | | | | |
|---|---|---|---|---|
| 2003/0069023 | A1* | 4/2003 | Toyryla | H04W 28/06 455/452.1 |
| 2004/0136393 | A1* | 7/2004 | Riveiro Insua | H04L 1/20 370/432 |
| 2006/0195576 | A1* | 8/2006 | Rinne | H04L 47/822 709/226 |
| 2008/0232432 | A1* | 9/2008 | Lee | H04L 27/2607 375/140 |
| 2008/0233989 | A1* | 9/2008 | Kim | H04B 17/24 455/517 |
| 2009/0040970 | A1* | 2/2009 | Ahmadi | H04B 7/2612 370/329 |
| 2009/0213766 | A1* | 8/2009 | Chindapol | H04B 7/2621 370/278 |
| 2011/0222456 | A1* | 9/2011 | Lei | H04B 7/0689 370/311 |
| 2011/0268046 | A1* | 11/2011 | Choi | H04L 5/0053 370/329 |
| 2012/0155412 | A1* | 6/2012 | Kawamura | H04J 11/003 370/329 |
| 2013/0016712 | A1* | 1/2013 | Tomeba | H04L 25/0204 370/345 |
| 2015/0103768 | A1* | 4/2015 | Chen | H04W 72/1278 370/329 |
| 2015/0156768 | A1* | 6/2015 | Guan | H04W 76/15 370/329 |
| 2015/0208408 | A1* | 7/2015 | Berggren | H04L 1/1861 370/329 |
| 2015/0237649 | A1* | 8/2015 | Zhang | H04W 72/0446 370/329 |
| 2016/0191223 | A1* | 6/2016 | Frederiksen | H04W 72/042 370/329 |
| 2016/0227541 | A1* | 8/2016 | Damnjanovic | H04L 5/001 |
| 2016/0269207 | A1* | 9/2016 | Gaal | H04L 27/122 |
| 2016/0374084 | A1 | 12/2016 | Zhang | |
| 2017/0013582 | A1* | 1/2017 | Takekawa | H04W 56/0045 |
| 2017/0230138 | A1* | 8/2017 | Xiong | H04W 72/0473 |
| 2018/0063725 | A1* | 3/2018 | Elsherif | H04B 7/0452 |
| 2018/0102818 | A1* | 4/2018 | Chae | H04W 72/0466 |
| 2018/0213464 | A1* | 7/2018 | Jeong | H04W 52/0235 |
| 2019/0082397 | A1* | 3/2019 | Hwang | H04W 52/325 |
| 2020/0028632 | A1* | 1/2020 | Iyer | H04L 1/1614 |
| 2020/0245376 | A1* | 7/2020 | Cao | H04W 72/042 |
| 2020/0287692 | A1* | 9/2020 | Boariu | H04W 72/085 |

FOREIGN PATENT DOCUMENTS

| | | |
|---|---|---|
| CN | 104901775 A | 9/2015 |
| CN | 104936293 A | 9/2015 |
| JP | 2012010348 A | 1/2012 |
| WO | 2008/130156 A1 | 10/2008 |
| WO | 2016015213 A1 | 2/2016 |
| WO | 2017130500 A1 | 8/2017 |

OTHER PUBLICATIONS

3GPP TR 38.913 V14.0.0 (Oct. 2016), 3rd Generation Partnership Project; Technical Specification Group Radio Access Network; Study on Scenarios and Requirements for Next Generation Access Technologies;(Release 14), 39 pages.
NTT DOCOMO:Initial views on DL control channel design, 3GPP Draft; R1-1610058, vol. RAN wGl, No. Lisbon, Portugal; Oct. 10, 2016-Oct. 14, 2016, Oct. 9, 2016, XP051150083, 7 pages.
Nokia et al: "Downlink network coordination for New Radio", 3GPP Draft;R1-167293, vol. RAN WG1, No. Gothenburg, Sweden, Aug. 22, 2016-Aug. 26, 2016, Aug. 21, 2016, XP05112581, 7 pages.
Convida Wireless:"On Downlink Control Channel Design for New Radio",3GPP Draft, R1-1610379, vol. RAN WG1, No. Lisbon, Portugal; Oct. 10, 2016-Oct. 14, 2016, Oct. 9, 2016, XP051150390, 4 pages.
Intel Corporation:Downlink control singaling design for shorten TTI, 3GPP Draft; R1-164160, 3rd Generation Partnership Project (3GPP), vol. RAN WG1 No. Nanjing, China; May 23, 2016-May 27, 2016, May 14, 2016, XP05109655, 5 pages.
Panasonic:"Discussion on Single level DCI and two-level DCI", 3GPP Draft;R1-166966, vol. RAN WG1, No. Gothenburg, Sweden Aug. 22, 2016-Aug. 26, 2016, Aug. 21, 2016, XP051140468, 5 pages.

* cited by examiner

DATA TRANSMISSION METHOD, NETWORK DEVICE, AND TERMINAL DEVICE

CROSS-REFERENCE TO RELATED APPLICATIONS

This application is a continuation of International Application No. PCT/CN2016/104461, filed on Nov. 3, 2016, the disclosure of which is hereby incorporated by reference in its entirety.

TECHNICAL FIELD

Embodiments of the present application relate to communications technologies, and in particular, to a data transmission method, a network device, and a terminal device.

BACKGROUND

In a wireless communications system, a terminal device receives downlink data or sends uplink data based on downlink control information (DCI) sent by a network device. The DCI includes scheduling information, power control command information, and the like. The scheduling information includes at least resource allocation (RA) information and/or modulation and coding scheme (MCS) information.

In a Long Term Evolution (LTE) system, the network device mainly adds the DCI to a physical downlink control channel (PDCCH), such as a PDCCH defined in Release 8 (R8) or an enhanced physical downlink control channel (PDCCH) defined in Release 11 (R11). In a data transmission process, user equipment performs blind detection on the PDCCH or the ePDCCH to obtain required DCI, and receives downlink data or sends uplink data based on the DCI. During blind detection, an error may occur, and an error occurrence possibility is referred to as a miss-detection probability. Generally, an indicator of a miss-detection probability of the PDCCH or the ePDCCH in LTE is $10^{-2}$.

Ultra-reliable and low-latency communication (URLLC) is introduced into future 5th generation mobile communication (5G). URLLC has two key indicators: 1. A user plane latency reaches 0.5 ms. 2. Reliability reaches a value ranging from $10^{-5}$ to 1. If a data transmission mechanism in LTE continues to be used for URLLC, a reliability indicator of URLLC obviously cannot be met because the indicator of the miss-detection probability of the PDCCH or the ePDCCH is $10^{-2}$.

SUMMARY

Embodiments of the present disclosure provide a data transmission method, a network device, and a terminal device, to implement highly reliable data transmission.

According to a first aspect, an embodiment of the present disclosure provides a data transmission method. The method is described from a perspective of a network device, and the method includes: configuring, by the network device, N groups of scheduling information based on a requirement of a terminal device group, configuring at least one piece of downlink data based on M groups of scheduling information in the N groups of scheduling information, and sending first downlink data to a first terminal device in a first transmission time unit; and correspondingly, determining, by the first terminal device, the N groups of scheduling information, and detecting the first downlink data in the first transmission time unit based on the N groups of scheduling information.

In the foregoing method, the first downlink data includes the at least one piece of downlink data, and the at least one piece of downlink data carries same information. Therefore, as long as the first terminal device successfully detects one piece of downlink data from the first downlink data, it indicates that the data is successfully received. In this way, the first downlink data can be successfully transmitted through a plurality of transmissions and one successful detection, thereby implementing highly reliable data transmission. In addition, not only low reliability of PDCCH dynamic scheduling is avoided without introducing a large quantity of control overheads, but also link adaptation can be obtained.

In a feasible implementation, when each of the M groups of scheduling information indicates one channel resource and/or one MCS, the first downlink data includes M pieces of downlink data, and that the network device configures the first downlink data based on the M groups of scheduling information in the N groups of scheduling information includes at least one of the following two steps: The network device modulates the M pieces of downlink data based on M modulation and coding schemes MCSs indicated in the M groups of scheduling information, and the network device respectively maps the downlink data onto M channel resources indicated in the M groups of scheduling information. In the process, the M pieces of first downlink data carry same information.

In the foregoing method, the first downlink data configured by the network device based on the M groups of scheduling information includes the M pieces of downlink data carrying the same information, and the M pieces of downlink data carrying the same information are sent to the first terminal device in the first transmission time unit, so that the first terminal device detects the M pieces of downlink data. This is mainly applicable to a case in which M is greater than 1.

In a feasible implementation, the M groups of scheduling information include an $i^{th}$ group of scheduling information in the N groups of scheduling information, and the $i^{th}$ group of scheduling information indicates $S_i$ channel resources, or the $i^{th}$ group of scheduling information indicates $S_i$ channel resources and $S_i$ MCSs, or the $i^{th}$ group of scheduling information indicates $S_i$ channel resources, $S_i$ MCSs, and $S_i$ redundancy versions RVs, where $S_i$ is an integer greater than 1.

That the network device configures $S_i$ pieces of downlink data included in the first downlink data includes at least one of the following two steps: The network device modulates the $S_i$ pieces of downlink data based on the $S_i$ MCSs indicated in the $i^{th}$ group of scheduling information, and the network device respectively maps the $S_i$ pieces of downlink data onto the $S_i$ channel resources.

In the foregoing method, for the $i^{th}$ group of scheduling information in the M groups of scheduling information, the first downlink data configured by the network device includes the $S_i$ pieces of downlink data, and the $S_i$ pieces of downlink data carry same information, so that the first terminal device detects the $S_i$ pieces of downlink data. This is mainly applicable to a case in which M=1 or M=2.

In a feasible implementation, the first downlink data further includes $S_j$ pieces of downlink data, the M groups of scheduling information include a $j^{th}$ group of scheduling information in the N groups of scheduling information, the $j^{th}$ group of scheduling information and the $i^{th}$ group of scheduling information are different scheduling information, and that the network device configures the first downlink data based on the M groups of scheduling information in the N groups of scheduling information includes: configuring, by the network device, the $S_j$ pieces of downlink data based on the $j^{th}$ group of scheduling information, where the $S_j$ pieces of downlink data carry same information, and the information carried in the $S_j$ pieces of downlink data is different from the information carried in the $S_i$ pieces of downlink data, and $S_j$ is a positive integer.

In a feasible implementation, the method further includes: configuring, by the network device, second downlink data based on P groups of scheduling information in the N groups of scheduling information, where P is a positive integer less than or equal to N; and sending, by the network device, the second downlink data to a second terminal device in a second transmission time unit. The first transmission time unit does not overlap the second transmission time unit, and the M groups of scheduling information are the same as, partially the same as, or different from the P groups of scheduling information; or the first transmission time unit overlaps or partially overlaps the second transmission time unit, and the M groups of scheduling information are different from the P groups of scheduling information.

In the foregoing method, the network device configures the N groups of scheduling information for one terminal device group, and sends, on one or more channel resources, downlink data to one or more UEs having a transmission requirement in the terminal device group. The plurality of UEs reuse the channel resource, thereby increasing utilization of the channel resource.

In a feasible implementation, before the sending, by the network device, first downlink data to a first terminal device in a first transmission time unit, the method further includes: sending, by the network device, scheduling information indication signaling to the first terminal device and/or the second terminal device, where the scheduling information indication signaling is used to indicate the N groups of scheduling information, and the scheduling information indication signaling is higher layer signaling or physical layer signaling. When the physical signaling is used, it is convenient to update the scheduling information. When the higher layer signaling is used, resources are reduced.

In a feasible implementation, the method further includes: sending, by the network device, downlink data indication signaling to the first terminal device in the first transmission time unit, where the downlink data indication signaling is used to indicate whether the first downlink data is sent within the first transmission time, thereby preventing the terminal device from performing blind detection on the first downlink data in real time.

According to a second aspect, an embodiment of the present disclosure provides a data transmission method. The method is described from a perspective of a first terminal device, and the method includes: determining, by the first terminal device, N groups of scheduling information, where N is a positive integer; and detecting, by the first terminal device, first downlink data in a first transmission time unit based on the N groups of scheduling information, where the first downlink data includes at least one piece of downlink data.

In the foregoing method, the first downlink data includes the at least one piece of downlink data, and the at least one piece of downlink data carries same information. Therefore, as long as the first terminal device successfully detects one piece of downlink data from the first downlink data, it indicates that the data is successfully received. In this way, the first downlink data can be successfully transmitted through a plurality of transmissions and one successful detection, thereby implementing highly reliable data transmission. In addition, not only low reliability of PDCCH dynamic scheduling is avoided without introducing a large quantity of control overheads, but also link adaptation can be obtained.

In a feasible implementation, the first downlink data is configured by the network device based on M groups of scheduling information in the N groups of scheduling information, M is a positive integer less than or equal to N.

In a feasible implementation, the first downlink data includes M pieces of downlink data, the M pieces of downlink data carry same information, and the detecting, by the first terminal device, first downlink data in a first transmission time unit based on the N groups of scheduling information includes: extracting, by the first terminal device in the first transmission time unit, the M pieces of downlink data from M channel resources indicated in the M groups of scheduling information; and/or demodulating, by the first terminal device, the M pieces of downlink data in the first transmission time unit based on M MCSs indicated in the M groups of scheduling information.

In a feasible implementation, the M groups of scheduling information include an $i^{th}$ group of scheduling information in the N groups of scheduling information, and the $i^{th}$ group of scheduling information indicates $S_i$ channel resources, or the $i^{th}$ group of scheduling information indicates $S_i$ channel resources and $S_i$ MCSs, or the $i^{th}$ group of scheduling information indicates $S_i$ channel resources, $S_i$ MCSs, and $S_i$ redundancy versions RVs, where $S_i$ is an integer greater than 1.

In a feasible implementation, the first downlink data includes $S_i$ pieces of downlink data, and the detecting, by the first terminal device, first downlink data in a first transmission time unit based on the N groups of scheduling information includes:

detecting, by the first terminal device, the $S_i$ pieces of downlink data based on the $i^{th}$ group of scheduling information, where the $S_i$ pieces of downlink data carry same information.

In a feasible implementation, the first downlink data further includes $S_j$ pieces of downlink data, the M groups of scheduling information include a $j^{th}$ group of scheduling information in the N groups of scheduling information, the $j^{th}$ group of scheduling information and the $i^{th}$ group of scheduling information are different scheduling information, and the detecting, by the first terminal device, first downlink data in a first transmission time unit based on the N groups of scheduling information includes: detecting, by the first terminal device, the $S_j$ pieces of downlink data based on the $j^{th}$ group of scheduling information, where the $S_j$ pieces of downlink data carry same information, and the information carried in the $S_j$ pieces of downlink data is different from the information carried in the $S_i$ pieces of downlink data, and $S_j$ is a positive integer.

In a feasible implementation, before the detecting, by the first terminal device, first downlink data in a first transmission time unit based on the N groups of scheduling information, the method further includes: receiving, by the first terminal device, scheduling information indication signaling sent by the network device, where the scheduling information indication signaling is used to indicate the N groups of scheduling information, and the scheduling information indication signaling is higher layer signaling or physical layer signaling.

In a feasible implementation, before the detecting, by the first terminal device, first downlink data in a first transmission time unit based on the N groups of scheduling information, the method further includes: receiving, by the first terminal device, downlink data indication signaling that is sent by the network device in the first transmission time unit, where the downlink data indication signaling is used to indicate whether the first downlink data is sent within the first transmission time.

According to a third aspect, an embodiment of the present disclosure provides a network device, including:

a processing module, configured to: configure N groups of scheduling information, where N is a positive integer; and configure first downlink data based on M groups of scheduling information in the N groups of scheduling information, where the first downlink data includes at least one piece of downlink data, M is a positive integer less than or equal to N; and a transceiver module, configured to send the first downlink data to the first terminal device in a first transmission time unit.

In a feasible implementation, the first downlink data includes M pieces of downlink data, the M pieces of downlink data carry same information, and when configuring the first downlink data based on the M groups of scheduling information in the N groups of scheduling information, the processing module specifically and separately modulates the M pieces of downlink data based on M modulation and coding schemes MCSs indicated in the M groups of scheduling information; and/or respectively maps the M pieces of downlink data onto M channel resources indicated in the M groups of scheduling information.

In a feasible implementation, the M groups of scheduling information include an $i^{th}$ group of scheduling information in the N groups of scheduling information, and the $i^{th}$ group of scheduling information indicates $S_i$ channel resources, or the $i^{th}$ group of scheduling information indicates $S_i$ channel resources and $S_i$ MCSs, or the $i^{th}$ group of scheduling information indicates $S_i$ channel resources, $S_i$ MCSs, and $S_i$ redundancy versions RVs, where $S_i$ is an integer greater than 1.

In a feasible implementation, the first downlink data includes $S_i$ pieces of downlink data, and the processing module specifically configures the $S_i$ pieces of downlink data based on the $i^{th}$ group of scheduling information when configuring the first downlink data based on the M groups of scheduling information in the N groups of scheduling information, where the $S_i$ pieces of downlink data carry same information.

In a feasible implementation, the first downlink data further includes $S_j$ pieces of downlink data, the M groups of scheduling information include a $j^{th}$ group of scheduling information in the N groups of scheduling information, the $j^{th}$ group of scheduling information and the $i^{th}$ group of scheduling information are different scheduling information, and the processing module specifically configures the $S_j$ pieces of downlink data based on the $j^{th}$ group of scheduling information when configuring the first downlink data based on the M groups of scheduling information in the N groups of scheduling information, where the $S_j$ pieces of downlink data carry same information, where the information carried in the $S_j$ pieces of downlink data is different from the information carried in the $S_i$ pieces of downlink data, and $S_j$ is a positive integer.

In a feasible implementation, the processing module is further configured to configure second downlink data based on P groups of scheduling information in the N groups of scheduling information, where P is a positive integer less than or equal to N; and the transceiver module is further configured to send the second downlink data to a second terminal device in a second transmission time unit.

In a feasible implementation, the first transmission time unit does not overlap the second transmission time unit, and the M groups of scheduling information are the same as, partially the same as, or different from the P groups of scheduling information; or the first transmission time unit overlaps or partially overlaps the second transmission time unit, and the M groups of scheduling information are different from the P groups of scheduling information.

In a feasible implementation, the transceiver module is further configured to send scheduling information indication signaling to the first terminal device and/or the second terminal device before sending the first downlink data to the first terminal device in the first transmission time unit, where the scheduling information indication signaling is used to indicate the N groups of scheduling information, and the scheduling information indication signaling is higher layer signaling or physical layer signaling.

In a feasible implementation, the transceiver module is further configured to send downlink data indication signaling to the first terminal device in the first transmission time unit, where the downlink data indication signaling is used to indicate whether the first downlink data is sent within the first transmission time.

According to a fourth aspect, an embodiment of the present disclosure provides a terminal device, where the terminal device is a first terminal device, and the first terminal device includes:

a processing module, configured to: determine N groups of scheduling information, where N is a positive integer; and detect first downlink data in a first transmission time unit based on the N groups of scheduling information, where the first downlink data includes at least one piece of downlink data.

In a feasible implementation, the first downlink data is configured by the network device based on M groups of scheduling information in the N groups of scheduling information, M is a positive integer less than or equal to N.

In a feasible implementation, the first downlink data includes M pieces of downlink data, the M pieces of downlink data carry same information, and when detecting the first downlink data in the first transmission time unit based on the N groups of scheduling information, the processing module is specifically configured to extract, in the first transmission time unit, the M pieces of downlink data from M channel resources indicated in the M groups of scheduling information; and/or the processing module is specifically configured to demodulate the M pieces of downlink data in the first transmission time unit based on M MCSs indicated in the M groups of scheduling information.

In a feasible implementation, the M groups of scheduling information include an $i^{th}$ group of scheduling information in the N groups of scheduling information, and the $i^{th}$ group of scheduling information indicates $S_i$ channel resources, or the $i^{th}$ group of scheduling information indicates $S_i$ channel resources and $S_i$ MCSs, or the $i^{th}$ group of scheduling information indicates $S_i$ channel resources, $S_i$ MCSs, and $S_i$ redundancy versions RVs, where $S_i$ is an integer greater than 1.

In a feasible implementation, the first downlink data includes $S_i$ pieces of downlink data, and the processing module is specifically configured to detect the $S_i$ pieces of downlink data based on the $i^{th}$ group of scheduling information when detecting the first downlink data in the first transmission time unit based on the N groups of scheduling information, where the $S_i$ pieces of downlink data carry same information.

In a feasible implementation, the first downlink data further includes $S_j$ pieces of downlink data, the M groups of scheduling information include a $j^{th}$ group of scheduling information in the N groups of scheduling information, the $j^{th}$ group of scheduling information and the $i^{th}$ group of scheduling information are different scheduling information, and the processing module is specifically configured to detect the $S_j$ pieces of downlink data based on the $j^{th}$ group of scheduling information when detecting the first downlink data in the first transmission time unit based on the N groups of scheduling information, where the $S_j$ pieces of downlink data carry same information, where the information carried in the $S_j$ pieces of downlink data is different from the information carried in the $S_i$ pieces of downlink data, and $S_j$ is a positive integer.

In a feasible implementation, the first terminal device further includes:

a transceiver module, configured to: before the processing module detects the first downlink data in the first transmission time unit based on the N groups of scheduling information, receive scheduling information indication signaling sent by the network device, where the scheduling information indication signaling is used to indicate the N groups of scheduling information, and the scheduling information indication signaling is higher layer signaling or physical layer signaling.

In a feasible implementation, the transceiver module is configured to: before the processing module detects the first downlink data in the first transmission time unit based on the N groups of scheduling information, receive downlink data indication signaling that is sent by the network device in the first transmission time unit, where the downlink data indication signaling is used to indicate whether the first downlink data is sent within the first transmission time.

According to a fifth aspect, an embodiment of the present disclosure provides a network device, including a processor, a memory, a communications interface, and a system bus. The memory, the communications interface, and the processor are connected to and communicate with each other by using the system bus, the memory is configured to store a computer execution instruction, the communications interface is configured to communicate with another device, and the processor is configured to run the computer execution instruction, so that the network device performs the steps in any one of the first aspect or the possible implementations of the first aspect.

According to a sixth aspect, an embodiment of the present disclosure provides a terminal device, where the terminal device is a first terminal device, and the first terminal device includes a processor, a memory, a communications interface, and a system bus. The memory, the communications interface, and the processor are connected to and communicate with each other by using the system bus, the memory is configured to store a computer execution instruction, the communications interface is configured to communicate with another device, and the processor is configured to run the computer execution instruction, so that the first terminal device performs the steps in any one of the first aspect or the possible implementations of the first aspect.

According to a seventh aspect, an embodiment of the present disclosure provides a data transmission method, including:

sending, by a network device, first downlink data to a first terminal device in a first transmission time unit, where at least one transport block included in the first downlink data includes scheduling information;

configuring, by the network device, second downlink data based on the scheduling information; and sending, by the network device, the second downlink data to the first terminal device in a second transmission time unit, where the first transmission time unit is earlier than the second transmission time unit.

In a feasible implementation, the first downlink data includes A transport blocks, and the scheduling information occupies the first X bits or the last X bits of one of the A transport blocks; or the first downlink data includes two transport blocks, and the scheduling information occupies the first X bits or the last X bits of each of the two transport blocks, where X is an integer greater than or equal to 1, and A is equal to 1 or 2.

In a feasible implementation, the transport block further includes scheduling information indication field information; and the first downlink data includes A transport blocks, the scheduling information indication field information occupies the first Y bits of one of the A transport blocks, and the scheduling information occupies X bits after the Y bits of the transport block; or the first downlink data includes two transport blocks, the scheduling information indication field information occupies the first Y bits of each of the two transport blocks, and the scheduling information occupies X bits after the Y bits of each of the two transport blocks, where X is an integer greater than or equal to 1, and A is equal to 1 or 2.

In a feasible implementation, joint coding is performed on all information in the transport block.

In a feasible implementation, before the sending, by a network device, first downlink data to a first terminal device in a first transmission time unit, the method further includes:

configuring, by the network device, N groups of scheduling information, where N is a positive integer; and configuring, by the network device, the first downlink data based on one of the N groups of scheduling information.

According to an eighth aspect, an embodiment of the present disclosure provides a data transmission method, including:

receiving, by a first terminal device, first downlink data that is sent by a network device in a first transmission time unit, where at least one transport block included in the first downlink data includes scheduling information;

demodulating, by the first terminal device, second downlink data in a second transmission time unit based on the scheduling information, where the second downlink data is configured by the network device based on the scheduling information, where the first transmission time unit is earlier than the second transmission time unit.

In a feasible implementation, the first downlink data includes A transport blocks, and the scheduling information occupies the first X bits or the last X bits of one of the A transport blocks; or the first downlink data includes two transport blocks, and the scheduling information occupies the first X bits or the last X bits of each of the two transport blocks, where X is an integer greater than or equal to 1, and A is equal to 1 or 2.

In a feasible implementation, the first downlink data includes A transport blocks, the scheduling information indication field information occupies the first Y bits of one of the A transport blocks, and the scheduling information occupies X bits after the Y bits of the transport block; or the first downlink data includes two transport blocks, the scheduling information indication field information occupies the first Y bits of each of the two transport blocks, and the scheduling information occupies X bits after the Y bits of each of the two transport blocks, where X is an integer greater than or equal to 1, and A is equal to 1 or 2.

In a feasible implementation, joint coding is performed on all information in the transport block.

In a feasible implementation, the receiving, by a first terminal device, first downlink data that is sent by a network device in a first transmission time unit includes:

receiving, by the first terminal device in the first transmission time unit, the first downlink data configured by the network device based on one of N groups of scheduling information.

According to a ninth aspect, an embodiment of the present disclosure provides a network device, including:

a transceiver module, configured to send first downlink data to a first terminal device in a first transmission time unit, where at least one transport block included in the first downlink data includes scheduling information; and a processing module, configured to configure second downlink data based on the scheduling information, where the transceiver module is further configured to send the second downlink data to the first terminal device in a second transmission time unit; and the first transmission time unit is earlier than the second transmission time unit.

In a feasible implementation, the first downlink data includes A transport blocks, and the scheduling information occupies the first X bits or the last X bits of one of the A transport blocks; or the first downlink data includes two transport blocks, and the scheduling information occupies the first X bits or the last X bits of each of the two transport blocks, where X is an integer greater than or equal to 1, and A is equal to 1 or 2.

In a feasible implementation, the transport block further includes scheduling information indication field information; and the first downlink data includes A transport blocks, the scheduling information indication field information occupies the first Y bits of one of the A transport blocks, and the scheduling information occupies X bits after the Y bits of the transport block; or the first downlink data includes two transport blocks, the scheduling information indication field information occupies the first Y bits of each of the two transport blocks, and the scheduling information occupies X bits after the Y bits of each of the two transport blocks, where X is an integer greater than or equal to 1, and A is equal to 1 or 2.

In a feasible implementation, joint coding is performed on all information in the transport block.

In a feasible implementation, the processing module is further configured to: configure N groups of scheduling information before the transceiver module sends the first downlink data to the first terminal device in the first transmission time unit, where N is a positive integer; and configure the first downlink data based on one of the N groups of scheduling information.

According to a tenth aspect, an embodiment of the present disclosure provides a terminal device, where the terminal device is a first terminal device, and the first terminal device includes:

a transceiver module, configured to receive first downlink data that is sent by a network device in a first transmission time unit, where at least one transport block included in the first downlink data includes scheduling information;

a processing module, configured to demodulate second downlink data in a second transmission time unit based on the scheduling information, where the second downlink data is configured by the network device based on the scheduling information, where the first transmission time unit is earlier than the second transmission time unit.

In a feasible implementation, the first downlink data includes A transport blocks, and the scheduling information occupies the first X bits or the last X bits of one of the A transport blocks; or the first downlink data includes two transport blocks, and the scheduling information occupies the first X bits or the last X bits of each of the two transport blocks, where X is an integer greater than or equal to 1, and A is equal to 1 or 2.

In a feasible implementation, the first downlink data includes A transport blocks, the scheduling information indication field information occupies the first Y bits of one of the A transport blocks, and the scheduling information occupies X bits after the Y bits of the transport block; or the first downlink data includes two transport blocks, the scheduling information indication field information occupies the first Y bits of each of the two transport blocks, and the scheduling information occupies X bits after the Y bits of each of the two transport blocks, where X is an integer greater than or equal to 1, and A is equal to 1 or 2.

In a feasible implementation, joint coding is performed on all information in the transport block.

In a feasible implementation, the transceiver module is specifically configured to receive, in the first transmission time unit, the first downlink data configured by the network device based on one of N groups of scheduling information.

According to an eleventh aspect, an embodiment of the present disclosure provides a network device, including a processor, a memory, a communications interface, and a system bus. The memory, the communications interface, and the processor are connected to and communicate with each other by using the system bus, the memory is configured to store a computer execution instruction, the communications interface is configured to communicate with another device, and the processor is configured to run the computer execution instruction, so that the network device performs the steps in any one of the seventh aspect or the possible implementations of the seventh aspect.

According to a twelfth aspect, an embodiment of the present disclosure provides a terminal device, where the terminal device is a first terminal device, and the first terminal device includes a processor, a memory, a communications interface, and a system bus. The memory, the communications interface, and the processor are connected to and communicate with each other by using the system bus, the memory is configured to store a computer execution instruction, the communications interface is configured to communicate with another device, and the processor is configured to run the computer execution instruction, so that the first terminal device performs the steps in any one of the seventh aspect or the possible implementations of the seventh aspect.

According to a thirteenth aspect, an embodiment of the present disclosure provides a computer storage medium, configured to store a computer software instruction used by the network device, where the computer software instruction includes a program designed to perform any one of the first aspect or the feasible implementations of the first aspect.

According to a fourteenth aspect, an embodiment of the present disclosure provides a computer storage medium, configured to store a computer software instruction used when the terminal device serves as a first terminal device, where the computer software instruction includes a program designed to perform any one of the first aspect or the feasible implementations of the first aspect.

According to a fifteenth aspect, an embodiment of the present disclosure provides a computer storage medium, configured to store a computer software instruction used by the network device, where the computer software instruction includes a program designed to perform any one of the seventh aspect or the feasible implementations of the seventh aspect.

According to a sixteenth aspect, an embodiment of the present disclosure provides a computer storage medium, configured to store a computer software instruction used when the terminal device serves as a first terminal device, where the computer software instruction includes a program designed to perform any one of the seventh aspect or the feasible implementations of the seventh aspect.

According to the data transmission method, the network device, and the terminal device that are provided in the embodiments of the present disclosure, the network device configures the N groups of scheduling information based on the requirement of the terminal device group, configures the at least one piece of downlink data based on the M groups of scheduling information in the N groups of scheduling information, and sends the first downlink data to the first terminal device in the first transmission time unit. Correspondingly, the first terminal device determines the N groups of scheduling information, and detects the first downlink data in the first transmission time unit based on the N groups of scheduling information. In the process, the first downlink data includes the at least one piece of downlink data, and the at least one piece of downlink data carries same information. Therefore, as long as the first terminal device successfully detects one piece of downlink data from the first downlink data, it indicates that the data is successfully received. In this way, the first downlink data can be successfully transmitted through a plurality of transmissions and one successful detection, thereby implementing highly reliable data transmission. In addition, not only low reliability of PDCCH dynamic scheduling is avoided without introducing a large quantity of control overheads, but also link adaptation can be obtained.

DESCRIPTION OF EMBODIMENTS

Figure 1:
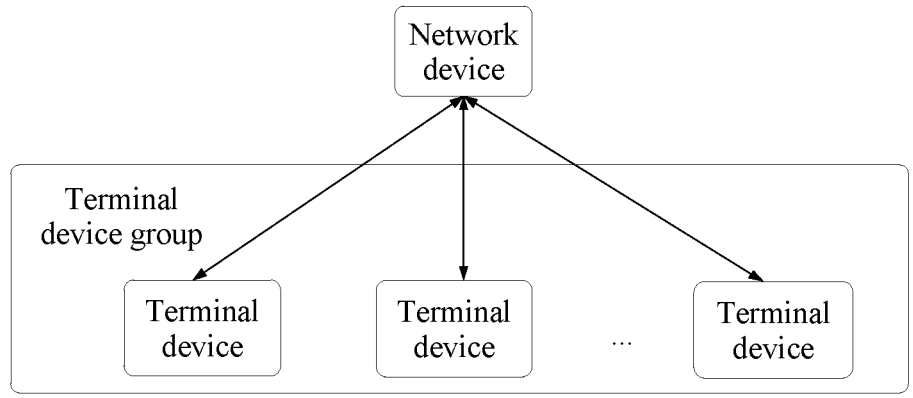
FIG. 1 is a schematic diagram of a network architecture to which a data transmission method is applicable according to the present disclosure.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances, so that the embodiments of the present disclosure described herein can be implemented in orders except the order illustrated or described herein. In addition, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Currently, when a PDCCH defined in Release R8 and an ePDCCH defined in Release R11 are used to carry DCI in LTE communication, an indicator of a miss-detection probability is $10^{-2}$. However, a reliability indicator of URLLC put forward in 5G reaches a value ranging from $10^{-5}$ to 1. Obviously, if a data transmission mechanism in LTE continues to be used, the reliability indicator of URLLC is far from being reached.

In view of this, the embodiments of the present disclosure provide a data transmission method, a network device, and a terminal device, to implement highly reliable data transmission.

The data transmission method described in the specification can be applied to various wireless communications systems in which a plurality of types of terminals exist. The wireless communications system imposes a relatively high requirement on data transmission reliability, for example, up to a value ranging from 10−5 to 1. For example, the wireless communications system is a Global System for Mobile Communications (GSM), a Code Division Multiple Access (CDMA) system, a Time Division Multiple Access (TDMA) system, Wideband Code Division Multiple Access (WCDMA), a Frequency Division Multiple Access (FDMA) system, an orthogonal frequency division multiple access (OFDMA) system, a single carrier FDMA (SC-FDMA) system, a general packet radio service (GPRS) system, a Long Term Evolution (LTE) system, an E-UTRA system, a 5G mobile communications system, or another communications system of such a type.

For example, the terminal device used in the embodiments of the present disclosure is a wireless terminal device. The wireless terminal may be a device providing voice and/or data connectivity for a user, a hand-held device having a wireless connection function, or another processing device connected to a wireless modem. The wireless terminal may communicate with one or more core networks through a radio access network (such as a Radio Access Network (RAN)). The wireless terminal may be a mobile terminal, such as a mobile phone (or referred to as a "cellular" phone) and a computer with a mobile terminal. For example, the wireless terminal may be a portable, pocket-sized, handheld, computer built-in, or in-vehicle mobile apparatus, which exchanges voice and/or data with the radio access network. For example, the wireless terminal is a device such as a personal communications service (PCS) phone, a cordless telephone set, a Session Initiation Protocol (SIP) phone, a wireless local loop (WLL) station, or a personal digital assistant (PDA). Alternatively, the wireless terminal may be referred to as a system, a subscriber unit, a subscriber station, a mobile station, a mobile console (mobile), a remote station, a remote terminal, an access terminal, a user terminal, a user agent, a user device, user equipment (UE), a PUE, or a VUE.

The network device used in this application may be a base station, an access point (AP), or the like. The base station may be a device that communicates with the wireless terminal over an air interface in an access network by using one or more sectors. The base station may be configured to mutually convert a received over-the-air frame and an IP packet and serve as a router between the wireless terminal and a rest portion of the access network, where the rest portion of the access network may include an Internet Protocol (IP) network. The base station may further coordinate attribute management of the air interface. For example, the base station may be a 5G gNodeB (gNB, gNodeB), an evolved NodeB (eNB, eNodeB) in LTE, even a base transceiver station (BTS) in GSM or CDMA, or a NodeB in WCDMA. This is not limited in this application.

For ease of description and clarity, technical solutions of the present disclosure are described below in detail by using an example in which a system architecture is specifically a 5G URLLC system. For details, refer to FIG. 1.

FIG. 1 is a schematic diagram of a network architecture to which a data transmission method is applicable according to the present disclosure. As shown in FIG. 1, a plurality of terminal device groups (only one group is shown in FIG. 1) exist in the network architecture, and a network device establishes a radio communication connection to each terminal device in the terminal device group. The data transmission method in the embodiments of the present disclosure is described below in detail based on FIG. 1. For details, refer to FIG. 2.

Figure 2:
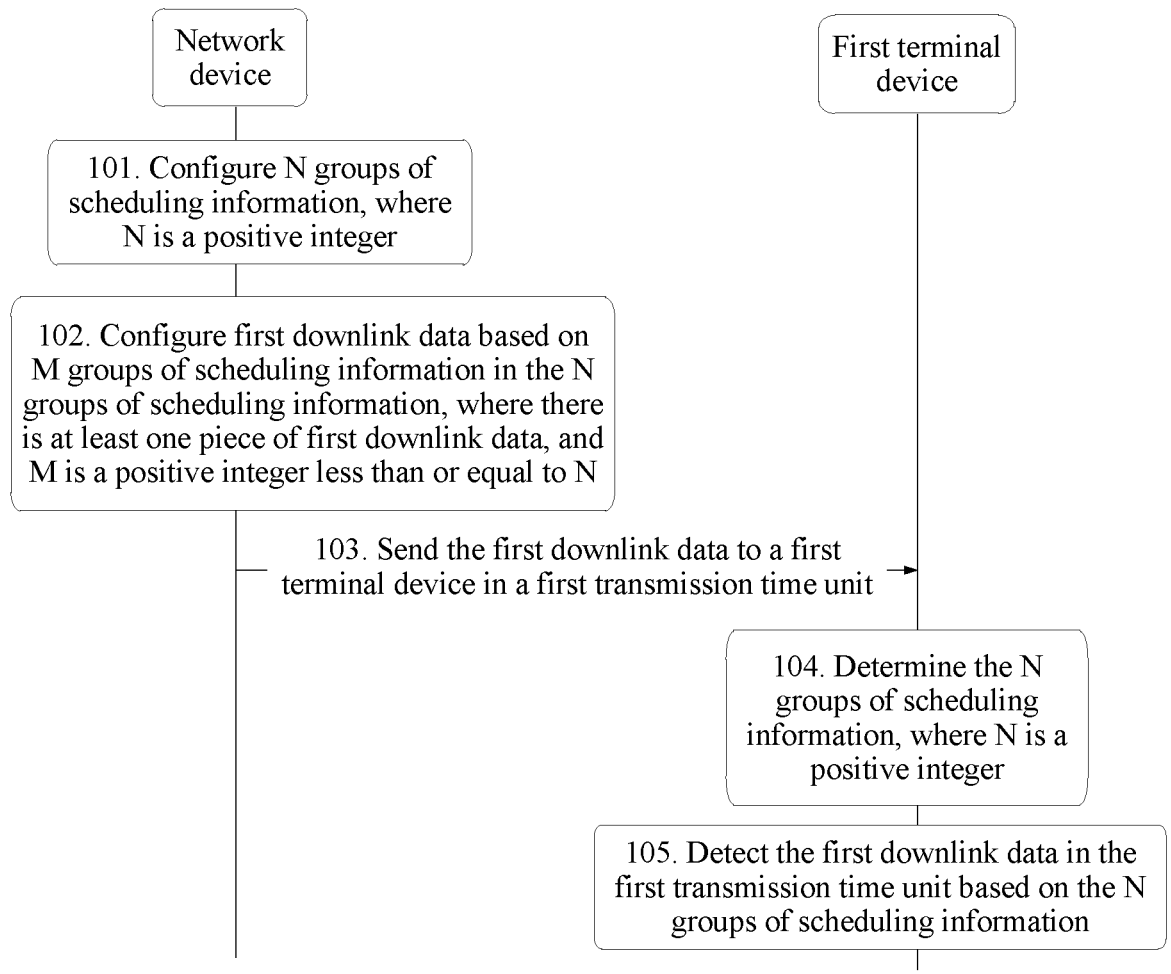
FIG. 2 is a signaling diagram of Embodiment 1 of a data transmission method according to the present disclosure.

FIG. 2 is a signaling diagram of Embodiment 1 of a data transmission method according to the present disclosure. The data transmission method includes the following steps.

101. A network device configures N groups of scheduling information, where N is a positive integer.

In this embodiment of the present disclosure, the N groups of scheduling information are configured for one terminal device group, for example, configured for one group of URLLC terminal devices for use. In this step, the network device configures the N groups of scheduling information for one terminal device group based on a current requirement of the terminal device group, where N is greater than or equal to 1. The scheduling information includes RA information and/or MCS information, and any two of the N groups of scheduling information are different. In this way, for terminal devices having different channel quality, the network device may transmit downlink data based on different scheduling information. For example, N=2. That two groups of scheduling information are different means that channel resources respectively indicated in the two groups of scheduling information are different from each other and MCSs are different from each other; or that channel resources respectively indicated in the two groups of scheduling information are different from each other but MCSs are the same; or that channel resources respectively indicated in the two groups of scheduling information are the same but MCSs are different from each other.

In this embodiment of the present disclosure, the N groups of scheduling information are valid in each transmission time unit within a period of time; or the N groups of scheduling information are valid in some transmission time units within a period of time. The period of time is configured by the network device or is preconfigured, and may be a finite time, for example, 100 ms; or may be an infinite time. A transmission time unit may also be referred to as a transmission time interval. Any two of a plurality of transmission time units included in the period of time have same duration, or at least two of a plurality of transmission time units included in the period of time have different duration.

102. The network device configures first downlink data based on M groups of scheduling information in the N groups of scheduling information, where there is at least one piece of first downlink data, and M is a positive integer less than or equal to N.

In this step, the network device may configure the first downlink data by using the following two methods.

Method 1: If each of the M groups of scheduling information indicates one channel resource and/or one MCS, the M groups of scheduling information indicate M channel resources, M MCSs, and/or M redundancy versions (RV, redundancy version). The network device configures M pieces of downlink data based on each of the M groups of scheduling information. The first downlink data includes the M pieces of downlink data, and the M pieces of downlink data carry same information. For example, M is equal to 5, and N is greater than or equal to 5. It should be noted that when the M pieces of downlink data carry same information, the M pieces of downlink data may also be considered as one piece of downlink data. This is not limited in the present disclosure. That the M pieces of downlink data carry the same information means that the M pieces of downlink data carry same original information bits. For example, if the M pieces of downlink data are respectively carried on M PDSCHs, the M PDSCHs carry same original information bits. However, after the original information bits are modulated and encoded based on different MCSs, obtained original information bits are different.

Any one of the M channel resources may be a contiguous or non-contiguous frequency domain resource. This is not limited in the present disclosure. Optionally, the M channel resources are respectively located in different bands in frequency domain, or the M channel resources have no correlation with each other.

Optionally, the M pieces of downlink data carry same information, and may be separately self-decoded. Therefore, receiving succeeds as long as the first terminal device successfully detects one of the M pieces of downlink data included in one piece of first downlink data. Assuming that a block error rate (BLER) of downlink data carried on each channel resource is 0.1, a probability that all downlink data carried on the M channel resources is incorrectly sent is $10^{-M}$. For example, when M=5, reliability of the first downlink data reaches a value ranging from $10^{-5}$ to 1.

Method 2: Any one of the M groups of scheduling information is indicated as an $i^{th}$ group of scheduling information, and the $i^{th}$ group of scheduling information indicates $S_i$ channel resources, $S_i$ MCSs, and/or $S_i$ RVs. $S_i$ is a positive integer. For example, $S_i$=5. In this case, the network device configures $S_i$ pieces of downlink data for the $i^{th}$ group of scheduling information in the M groups of scheduling information, the first downlink data includes the $S_i$ pieces of downlink data, and the $S_i$ pieces of downlink data carry same information. If all the pieces of scheduling information indicate a same quantity of channel resources and/or a same quantity of MCSs, the network device configures M×$S_i$ pieces of downlink data. It should be noted that when the M groups of downlink data corresponding to the M groups of scheduling information carry different information, and the $S_i$ pieces of downlink data carry same information, the $S_i$ pieces of downlink data may be considered as one piece of downlink data. Therefore, the network device configures M×$S_i$ pieces of downlink data that are equivalent to M pieces of downlink data. This is not limited in the present disclosure.

Optionally, the $S_i$ pieces of downlink data carry same information, and may be separately self-decoded. Therefore, as long as the first terminal device successfully detects one of the $S_i$ pieces of downlink data included in the first downlink data, the downlink data corresponding to the $i^{th}$ group of scheduling information is successfully received.

Any one of the $S_i$ channel resources may be a contiguous or non-contiguous frequency domain resource. This is not limited in the present disclosure. Optionally, the $S_i$ channel resources are respectively located in different bands in frequency domain, or the $S_i$ channel resources have no correlation with each other.

Optionally, the $S_i$ pieces of first downlink data carry same information, and may be separately self-decoded. Therefore, as long as the first terminal device successfully detects one of the $S_i$ pieces of downlink data included in the first downlink data, the first downlink data corresponding to the $i^{th}$ group of scheduling information is successfully received.

Optionally, in this step, a first downlink data packet is merely an initially transmitted packet, and there is no retransmitted packet. In other words, the network device always considers that the first terminal device correctly receives the first downlink data. Because the reliability of the first downlink data is a value ranging from $10^{-5}$ to 1, there is no need to support a hybrid automatic repeat request (HARQ).

103. The network device sends the first downlink data to a first terminal device in a first transmission time unit.

After configuring of the first downlink data, the network device sends the first downlink data to the first terminal device in the first transmission time unit. The first terminal device is one terminal device in the terminal device group.

104. The first terminal device determines the N groups of scheduling information, where N is a positive integer.

The network device may indicate the N groups of scheduling information to the first terminal device in the terminal device group by using higher layer signaling or physical layer signaling. Correspondingly, the first terminal device determines the N groups of scheduling information configured by the network-side device.

105: The first terminal device detects the first downlink data in the first transmission time unit based on the N groups of scheduling information.

In this step, the first terminal device detects the first downlink data in the first transmission time unit based on the N groups of scheduling information. Specifically, the first terminal device performs a cyclic redundancy check (CRC) on received data. If the CRC check succeeds, it is considered that the first downlink data is detected; or if the CRC check fails, it is considered that the first downlink data is not detected. Therefore, execution of step 105 includes two cases. In a first case, the first terminal device detects no first downlink data in the first transmission time unit based on the N groups of scheduling information. In other words, the first terminal device receives no first downlink data. In a second case, the first terminal device detects the first downlink data in the first transmission time unit based on the N groups of scheduling information. The first downlink data is configured by the network device based on the M groups of scheduling information in the N groups of scheduling information, and the first downlink data includes at least one piece of downlink data, and M≤N.

When each of the M groups of scheduling information indicates one channel resource and/or one MCS, the first downlink data includes M pieces of downlink data, and the M pieces of downlink data carry same information. In this case, as long as the first terminal successfully detects one of the M pieces of downlink data included in one piece of first downlink data, it indicates that the first downlink data is successfully received. Alternatively, when an $i^{th}$ group of scheduling information in the M groups of scheduling information indicates $S_i$ channel resources and/or $S_i$ MCSs, the first downlink data includes $S_i$ pieces of downlink data, the first downlink data configured by the network device based on the $i^{th}$ group of scheduling information includes the $S_i$ pieces of downlink data, and the $S_i$ pieces of downlink data carry same information. In this case, as long as the first terminal successfully detects one of the $S_i$ pieces of downlink data, it indicates that the first downlink data configured by the network device based on the $i^{th}$ group of scheduling information is successfully received.

In a feasible implementation, the first downlink data includes M pieces of downlink data, and the M pieces of downlink data carry same information, and that the first terminal device detects the first downlink data in the first transmission time unit based on the N groups of scheduling information includes the following: The first terminal device extracts, in the first transmission time unit, the M pieces of downlink data from M channel resources indicated in the M groups of scheduling information; and/or the first terminal device demodulates the M pieces of downlink data in the first transmission time unit based on M MCSs indicated in the M groups of scheduling information.

In another feasible implementation, the M groups of scheduling information include an $i^{th}$ group of scheduling information in the N groups of scheduling information, and the first downlink data includes $S_i$ pieces of downlink data, and that the first terminal device detects the first downlink data in the first transmission time unit based on the N groups of scheduling information includes the following: The first terminal device detects the $S_i$ pieces of downlink data based on the $i^{th}$ group of scheduling information, where the $S_i$ pieces of downlink data carry same information. The first downlink data further includes $S_j$ pieces of downlink data, the M groups of scheduling information further include a $j^{th}$ group of scheduling information in the N groups of scheduling information, and the $j^{th}$ group of scheduling information and the $i^{th}$ group of scheduling information are different scheduling information, and that the first terminal device detects the first downlink data in the first transmission time unit based on the N groups of scheduling information includes the following: The first terminal device detects the $S_j$ pieces of downlink data based on the $j^{th}$ group of scheduling information, where the $S_j$ pieces of downlink data carry same information, and the information carried in the $S_j$ pieces of downlink data is different from the information carried in the $S_i$ pieces of downlink data, and $S_j$ is a positive integer.

It should be noted that step 101 to step 105 may not be performed in an order of 101 to 105. For example, step 104 may be performed before step 102 or step 103. This is not limited in the present disclosure.

According to the data transmission method provided in this embodiment of the present disclosure, the network device configures the N groups of scheduling information based on the requirement of the terminal device group, configures the at least one piece of downlink data based on the M groups of scheduling information in the N groups of scheduling information, and sends the first downlink data to the first terminal device in the first transmission time unit. Correspondingly, the first terminal device determines the N groups of scheduling information, and detects the first downlink data in the first transmission time unit based on the N groups of scheduling information. In the process, the first downlink data includes the at least one piece of downlink data, and the at least one piece of downlink data carries same information. Therefore, as long as the first terminal device successfully detects one piece of downlink data from the first downlink data, it indicates that the data is successfully received. In this way, the first downlink data can be successfully transmitted through a plurality of transmissions and one successful detection, thereby implementing highly reliable data transmission. In addition, not only low reliability of PDCCH dynamic scheduling is avoided without introducing a large quantity of control overheads, but also link adaptation can be obtained.

Figure 3A:
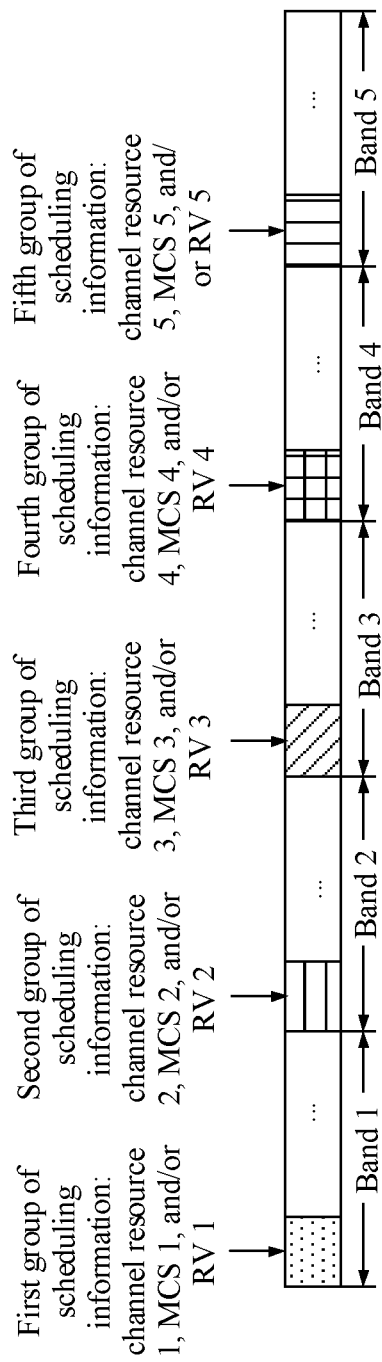
FIG. 3A is a schematic example diagram of scheduling information in a data transmission method according to the present disclosure.

Optionally, in the foregoing embodiment, each of the M groups of scheduling information indicates one channel resource and/or one MCS. For details, refer to FIG. 3A. FIG. 3A is a schematic example diagram of scheduling information in a data transmission method according to the present disclosure.

Referring to FIG. 3A, that M=5 is used as an example. The M groups of scheduling information include a first group of scheduling information to a fifth group of scheduling information (shown as portions filled with five patterns in the figure) that are shown in the figure, the five groups of scheduling information are respectively located in different bands, and a channel resource in each group of scheduling information is a contiguous frequency domain resource. In this case, the first downlink data includes M pieces of downlink data, and that the network device configures the first downlink data based on the M groups of scheduling information in the N groups of scheduling information includes at least one of the following two steps: The network device modulates the M pieces of downlink data based on M modulation and coding schemes MCSs indicated in the M groups of scheduling information, and the network device respectively maps the downlink data onto M channel resources indicated in the M groups of scheduling information. In the process, the M pieces of first downlink data carry same information.

In the foregoing embodiment, the first downlink data configured by the network device based on the M groups of scheduling information includes the M pieces of downlink data carrying the same information, and the M pieces of downlink data carrying the same information are sent to the first terminal device in the first transmission time unit, so that the first terminal device detects the M pieces of downlink data. This is mainly applicable to a case in which M is greater than 1.

Figure 3B:
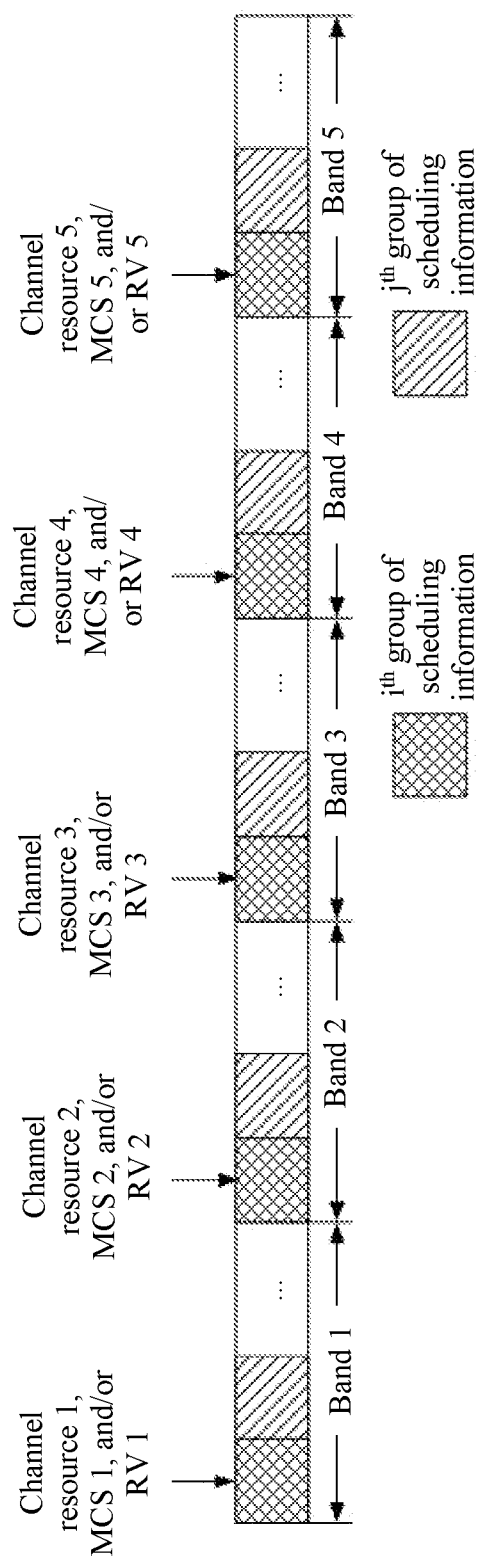
FIG. 3B is another schematic example diagram of scheduling information in a data transmission method according to the present disclosure.

Optionally, in the foregoing embodiment, any one of the M groups of scheduling information is indicated as an $i^{th}$ group of scheduling information, and the $i^{th}$ group of scheduling information indicates $S_i$ channel resources, or the $i^{th}$ group of scheduling information indicates $S_i$ channel resources and $S_i$ MCSs, or the $i^{th}$ group of scheduling information indicates $S_i$ channel resources, $S_i$ MCSs, and $S_i$ redundancy versions (RV), where $S_i$ is an integer greater than 1. In this case, the first downlink data includes $S_i$ pieces of downlink data. For example, $S_i$=5, and the $S_i$ channel resources are respectively located in different bands in frequency domain, or the $S_i$ channel resources have no correlation with each other. A channel resource in each band may be a continuous or non-contiguous frequency domain resource. This is not limited in this embodiment of the present disclosure. In addition, in this embodiment of the present disclosure, downlink data carried on the $S_i$ channel resources may be separately self-decoded. To be specific, the network device configures, based on any one of the foregoing combinations, the $S_i$ pieces of downlink data included in the first downlink data. Then the network device sends the $S_i$ pieces of downlink data on the $S_i$ channel resources. For details, refer to FIG. 3B. FIG. 3B is another schematic example diagram of scheduling information in a data transmission method according to the present disclosure.

Referring to FIG. 3B, that $S_i$=5 is used as an example. An $i^{th}$ group of scheduling information indicates $S_i$ channel resources, and the $S_i$ channel resources are respectively located in different bands (shown as patterns filled with oblique grids in the figure). In this case, the first downlink data configured by the network device includes $S_i$ pieces of downlink data for the $i^{th}$ group of scheduling information in the M groups of scheduling information, and the $S_i$ pieces of downlink data carry same information. Specifically, the first downlink data corresponding to the $i^{th}$ group of scheduling information includes the $S_i$ pieces of downlink data, and that the network device configures the $S_i$ pieces of downlink data included in the first downlink data includes at least one of the following two steps: The network device modulates the $S_i$ pieces of downlink data based on $S_i$ MCSs indicated in the $i^{th}$ group of scheduling information, and the network device respectively maps the $S_i$ pieces of downlink data onto the $S_i$ channel resources.

In the foregoing embodiment, assuming that a block error rate (BLER) of downlink data carried on each channel resource is 0.1, a probability of an error occurring when all downlink data carried on the $S_i$ channel resources is sent is $10^{-Si}$. For example, when $S_i=5$, reliability of the first downlink data reaches a value ranging from $10^{-5}$ to 1.

In the foregoing embodiment, a channel resource in the $i^{th}$ group of scheduling information is a non-continuous frequency domain resource. In addition to the foregoing method, the network device may configure the first downlink data for the $i^{th}$ group of scheduling information in the M groups of scheduling information in another manner. For example, the network device sends one piece of downlink data included in the first downlink data only on the non-continuous frequency domain resource. To achieve reliability of a value ranging from $10^{-5}$ to 1, an extremely low MCS is required. In this case, that the network device configures the first downlink data based on the M groups of scheduling information in the N groups of scheduling information includes at least one of the following two steps: The network device modulates one piece of downlink data based on an extremely low MCS indicated in the $i^{th}$ group of scheduling information, and the network device maps the piece of downlink data onto the channel resource indicated in the $i^{th}$ group of scheduling information.

In the foregoing embodiment, the network device processes, in the same manner, scheduling information other than the $i^{th}$ group of scheduling information in the M groups of scheduling information, for example, a $j^{th}$ group of scheduling information (assuming that $s_j=5$, $s_j$ groups of scheduling information indicated in the $j^{th}$ group of scheduling information are shown as portions filled with oblique lines in FIG. 3B). Details are not described herein again.

In the foregoing embodiment, for the $i^{th}$ group of scheduling information in the M groups of scheduling information, the first downlink data configured by the network device includes the $S_i$ pieces of downlink data, and the $S_i$ pieces of downlink data carry the same information, so that the first terminal device detects the $S_i$ pieces of downlink data. This is mainly applicable to a case in which M=1 or M=2.

Optionally, in an embodiment of the present disclosure, the data transmission method shown in FIG. 2 further includes: configuring, by the network device based on P groups of scheduling information in the N groups of scheduling information, second downlink data corresponding to the P groups of scheduling information, where P≤N; and sending, by the network device in a second transmission time unit, the second downlink data corresponding to the P groups of scheduling information to a second terminal device, where the second terminal device is a terminal device other than the first terminal device in the terminal device group. P is a positive integer less than or equal to N. In the process, for how the network device configures the second downlink data based on the P groups of scheduling information, refer to 102. Details are not described herein again.

Figure 4A:
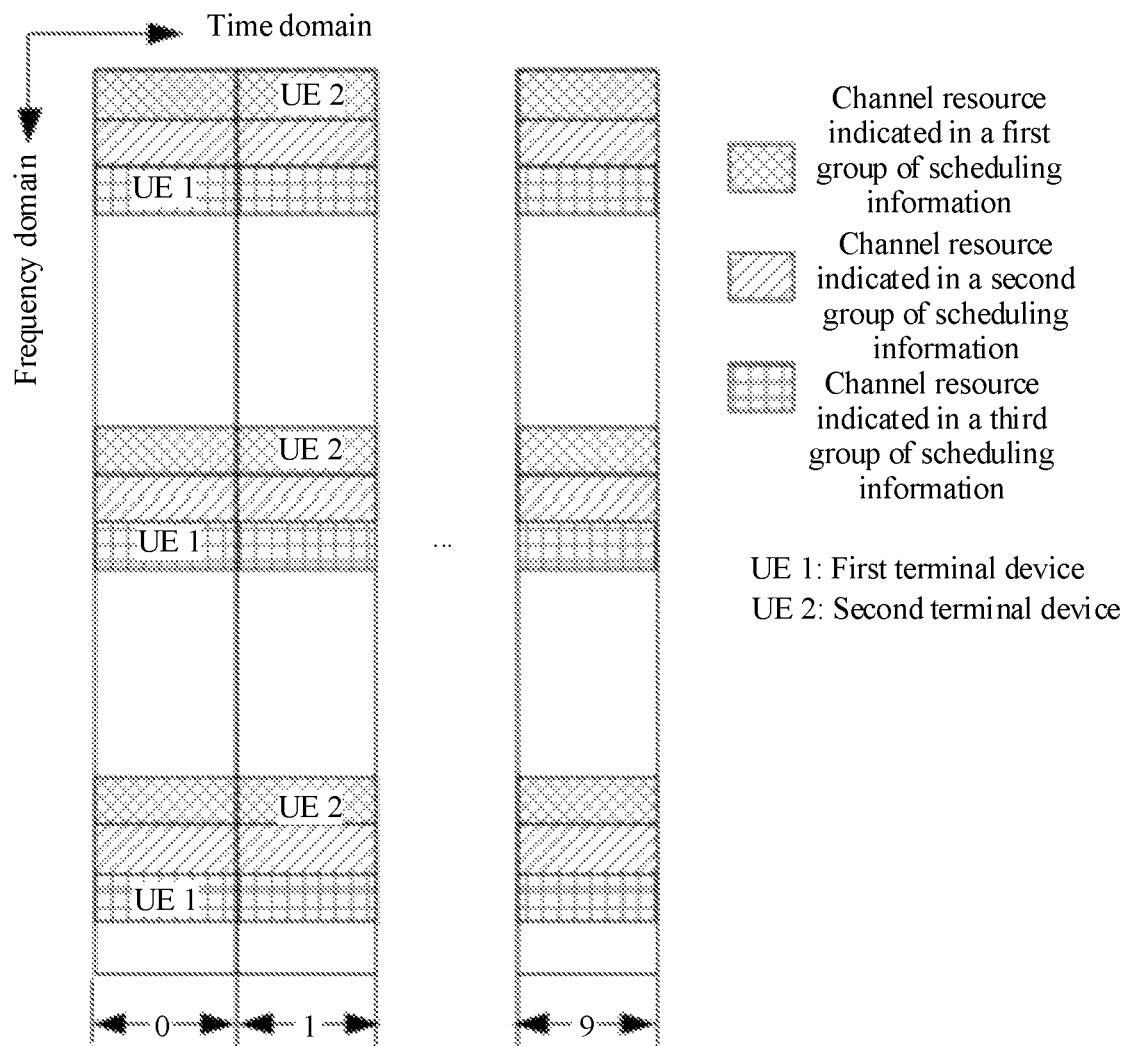
FIG. 4A is a schematic example diagram of a transmission time unit and scheduling information in a data transmission method according to the present disclosure.
Figure 4B:
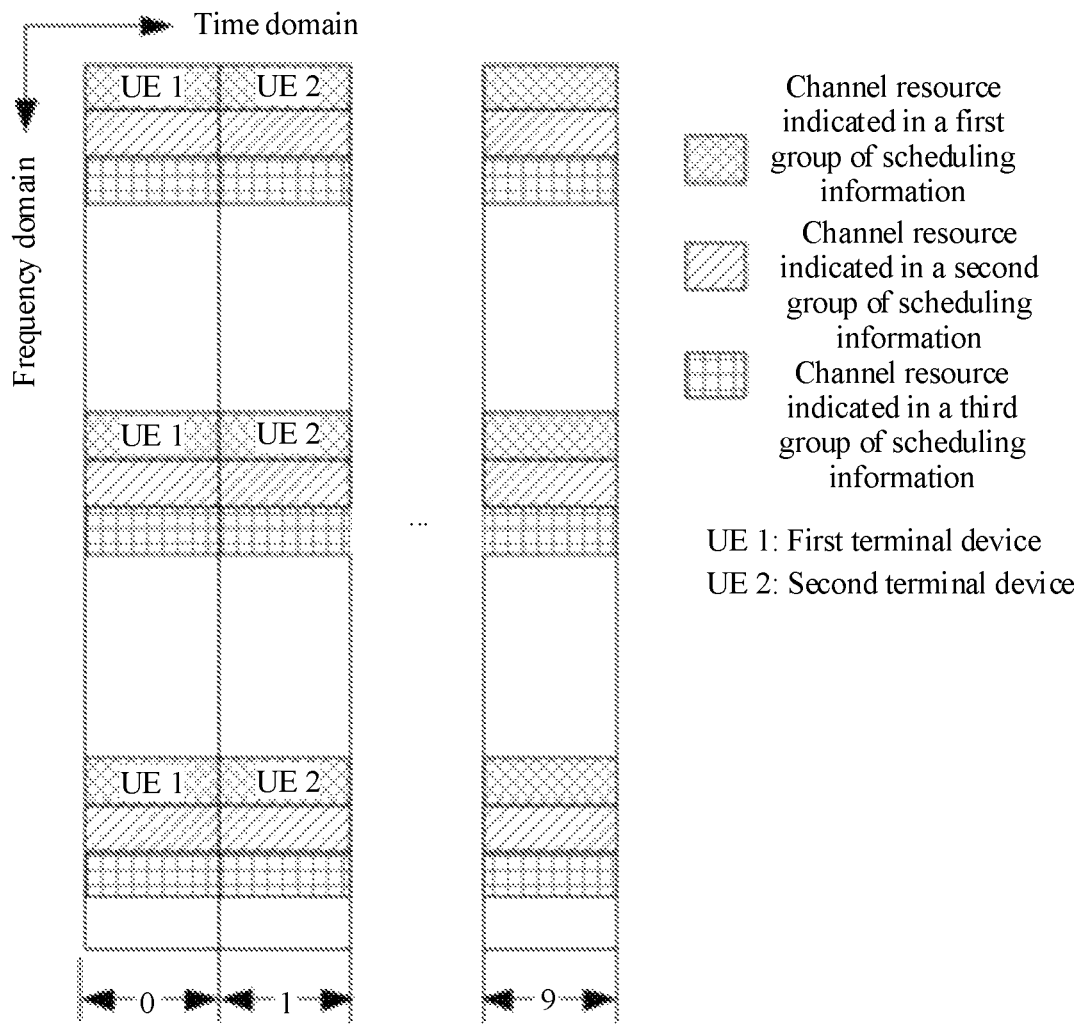
FIG. 4B is another schematic example diagram of a transmission time unit and scheduling information in a data transmission method according to the present disclosure.

In a feasible implementation, the first transmission time unit in which the network device sends the first downlink data configured based on the M groups of scheduling information does not overlap the second transmission time unit in which the network device sends the second downlink data configured based on the P groups of scheduling information, and the M groups of scheduling information are the same as, partially the same as, or different from the P groups of scheduling information. For details, refer to FIG. 4A and FIG. 4B. FIG. 4A is a schematic example diagram of a transmission time unit and scheduling information in a data transmission method according to the present disclosure, and FIG. 4B is another schematic example diagram of a transmission time unit and scheduling information in a data transmission method according to the present disclosure.

Referring to FIG. 4A, the first terminal device is UE 1 located in a first transmission time unit 0, the second terminal device is UE 2 located in a second transmission time unit 1, and the first terminal device and the second terminal device use different scheduling information. Referring to FIG. 4B, the first terminal device UE 1 is located in a first transmission time unit 0, the second terminal device UE 2 is located in a second transmission time unit 1, and the first terminal device and the second terminal device use same scheduling information.

Figure 4C:
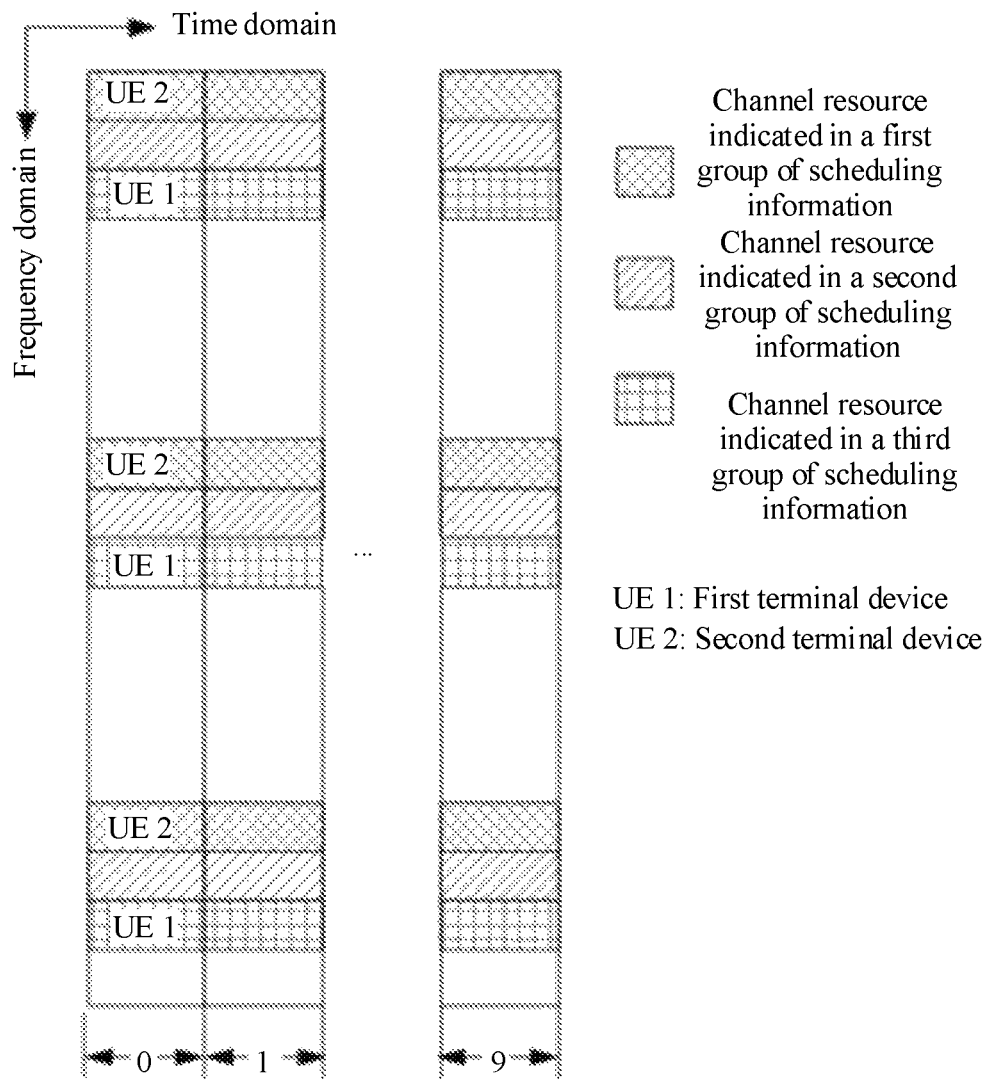
FIG. 4C is a still another schematic example diagram of a transmission time unit and scheduling information in a data transmission method according to the present disclosure.

In another feasible implementation, the first transmission time unit in which the network device sends the second downlink data configured based on the M groups of scheduling information overlaps or partially overlaps the second transmission time unit in which the network device sends the second downlink data configured based on the P groups of scheduling information, and the M groups of scheduling information are different from the P groups of scheduling information. For details, refer to FIG. 4C. FIG. 4C is still another schematic example diagram of a transmission time unit and scheduling information in a data transmission method according to the present disclosure.

Referring to FIG. 4C, the first terminal device UE 1 and the second terminal device are both located in a first transmission time unit 0, but the first terminal device and the second terminal device use different scheduling information.

A URLLC service has a feature of a low latency. In other words, the service is sent at any time. Therefore, a resource needs to be reserved for a terminal device. However, if one or more channel resources are reserved for each terminal device, and each terminal device cannot use a channel resource of another terminal device, a large quantity of reserved resources exist in a URLLC system. In this embodiment of the present disclosure, the network device configures the N groups of scheduling information for one terminal device group, and sends, on one or more channel resources, downlink data to one or more UEs having a transmission requirement in the terminal device group. The plurality of UEs reuse the channel resource, thereby increasing utilization of the channel resource.

Optionally, in the foregoing embodiment, the network device further sends scheduling information indication signaling to the first terminal device and/or the second terminal device before sending the first downlink data to the first terminal device in the first transmission time unit. The scheduling information indication signaling is used to indicate the N groups of scheduling information. The scheduling information indication signaling is higher layer signaling, such as dedicated RRC signaling or broadcast signaling. Alternatively, the scheduling signaling may be physical layer signaling. The physical layer signaling is group-specific physical layer signaling. In other words, each terminal device group corresponds to one piece of physical layer signaling. To enable data transmission reliability to reach a value ranging from $10^{-5}$ to 1, reliability of the physical layer signaling needs to be greater than a value ranging from $10^{-5}$ to 1. In this embodiment of the present disclosure, the physical layer signaling may reach the reliability indicator by occupying more channel resources. Therefore, in comparison with use of physical layer signaling specific to a terminal device, use of the group-specific physical layer signaling may greatly reduce overheads.

Optionally, correspondingly, before step 104, the method further includes: receiving, by the first terminal device, the scheduling information indication signaling, where the scheduling information indication signaling is used to indicate the N groups of scheduling information.

In the foregoing embodiment, when sending the physical layer signaling, the network device may send the physical layer signaling based on a time period T. For example, the network device sends the physical layer signaling to the first terminal device and/or the second terminal device every other time period T. The time period T is a positive number, such as 1 ms, 0.5 ms, 0.25 ms, 0.125 ms, 10 ms, 2 ms, one transmission time unit, two transmission time units, three transmission time units, or four transmission time units. The time period T is configured by the network device or is predefined.

In the foregoing embodiment, the network device may send the physical layer signaling in a semi-persistent (Semi-Persistent) manner. In this case, the network device sends the physical layer signaling to the terminal device based on the time period T. For example, the network device detects, every other time period T, whether the physical layer signaling is updated; and if the physical layer signaling is updated, sends new physical layer signaling.

In the foregoing embodiment, the N groups of scheduling information are preconfigured. Because the N preconfigured groups of scheduling information do not need to frequently change, the higher layer signaling may be used to indicate the N groups of scheduling information. In this case, the network device sends the higher layer signaling for different terminal device groups to indicate the N groups of scheduling information. For example, the higher layer signaling is radio resource control (RRC) signaling or Media Access Control (MAC) signaling.

In the foregoing embodiment, because a URLLC service may be triggered at any time, once CRC check performed on the first downlink data succeeds, it is considered that the terminal device successfully receives the first downlink data. To prevent the terminal device from performing blind detection on the first downlink data in real time, downlink data indication signaling is introduced in this embodiment of the present disclosure. Specifically, in each transmission time unit for sending the first downlink data, the network device further sends the downlink data indication signaling, and the downlink data indication signaling is used to indicate whether downlink data is sent within the first transmission time. The downlink data is used in a general sense, and may be sent to any terminal device served by the network device. Once the downlink data indication signaling indicates that downlink data is sent, any terminal device that may receive a URLLC service and that is served by the network device needs to detect the downlink data. For example, the network device sends the downlink data indication signaling in the first transmission time unit. If the downlink data indication signaling indicates that downlink data is sent in the first transmission time unit, even if the downlink data is not sent to the first terminal device, the first terminal device still performs blind detection on the first downlink data in the first transmission time unit; otherwise, the first terminal device does not need to perform blind detection on the first downlink data in the first transmission time unit. For example, the downlink data indication signaling is physical layer signaling. Reliability of the physical layer signaling needs to be extremely high, for example, greater than a value ranging from $10^{-5}$ to 1. Correspondingly, the first terminal device further receives the downlink data indication signaling within the first transmission time.

Figure 5:
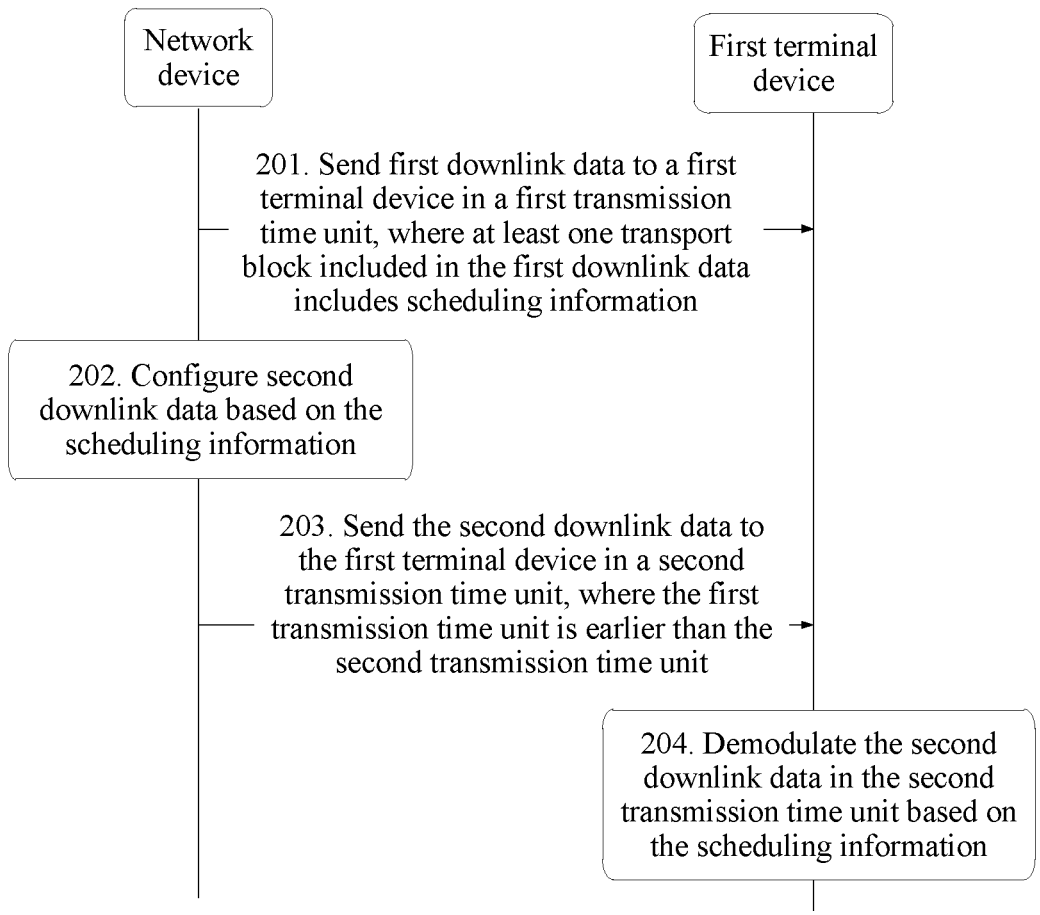
FIG. 5 is a signaling diagram of Embodiment 2 of a data transmission method according to the present disclosure.

FIG. 5 is a signaling diagram of Embodiment 2 of a data transmission method according to the present disclosure. The data transmission method includes the following steps.

201. A network device sends first downlink data to a first terminal device in a first transmission time unit, where at least one transport block included in the first downlink data includes scheduling information.

In this step, the network device sends the first downlink data including the scheduling information to the first terminal device in the first transmission time unit, and the scheduling information is included in the at least one transport block included in the first downlink data.

202. The network device configures second downlink data based on the scheduling information.

In this step, the network device configures the second downlink data based on the scheduling information, such as a channel resource, an MCS, or an RB version indicated in the scheduling information.

203. The network device sends the second downlink data to the first terminal device in a second transmission time unit, where the first transmission time unit is earlier than the second transmission time unit.

In this step, the network device sends the second downlink data to the first terminal device in the second transmission time unit later than the first transmission time unit. Correspondingly, the first terminal device receives the first downlink data in the first transmission time unit.

204. The first terminal device demodulates the second downlink data in the second transmission time unit based on the scheduling information.

In this step, the first terminal device demodulates the received second downlink data in the second transmission time unit, and the second downlink data is configured by the network device based on the scheduling information.

According to the data transmission method provided in this embodiment of the present disclosure, the network device sends the first downlink data to the first terminal device in the first transmission time unit, where the at least one transport block included in the first downlink data includes the scheduling information; configures the second downlink data based on the scheduling information; and sends the second downlink data to the first terminal device in the second transmission time unit. Correspondingly, the first terminal device demodulates the received second downlink data in the second transmission time unit. In the process, the network device first sends the scheduling information to the first terminal device, and then sends the downlink data configured based on the scheduling information to the first terminal device, so that the first terminal device can detect the downlink data based on the scheduling information, thereby implementing highly reliable data transmission. In addition, not only low reliability of PDCCH dynamic scheduling is avoided without introducing a large quantity of control overheads, but also link adaptation can be obtained.

Figure 6A:
FIG. 6A is a schematic diagram of a transport block including scheduling information in a data transmission method according to the present disclosure.

Optionally, the first downlink data includes one or two transport blocks. One transport block in the first downlink data includes the scheduling information. The scheduling information occupies X bits of the transport block. For example, the scheduling information occupies the first X bits or the last X bits of the transport block. In other words, the first X bits or the last X bits of the transport block are the scheduling information. X is an integer greater than or equal to 1. For details, refer to FIG. 6A. FIG. 6A is a schematic diagram of a transport block including scheduling information in a data transmission method according to the present disclosure. Referring to FIG. 6A, the first X bits of a transport block, for example, a downlink shared channel (DL-SCH), are the scheduling information.

Optionally, the first downlink data includes two transport blocks. The scheduling information occupies X bits of each of the two transport blocks. For example, the scheduling information is located in the first X bits or the last X bits of each of the two transport blocks. In other words, the first X bits or the last X bits of each of the two transport blocks are the scheduling information.

Figure 6B:
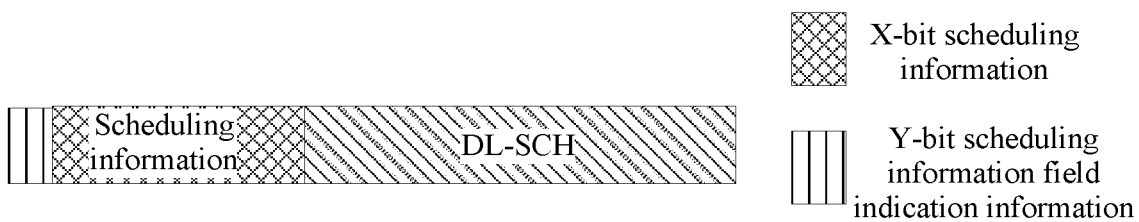
FIG. 6B is a schematic diagram of a transport block including scheduling information indication field information and scheduling information in a data transmission method according to the present disclosure.

Optionally, in the foregoing embodiment, in addition to the scheduling information, a transport block may further include scheduling information indication field information. The scheduling information indication field information occupies Y bits of one or two transport blocks in the first downlink data. For example, the scheduling information indication field information occupies the first Y bits of the one or two transport blocks, and the scheduling information occupies X bits after the Y bits. The scheduling information indication field information is used to indicate whether the scheduling information exists in the first downlink data. If the scheduling information indication field information indicates that the first downlink data includes the scheduling information, the first terminal device considers that the first downlink data includes the scheduling information; otherwise, the first terminal device considers that the first downlink data does not include the scheduling information. For details, refer to FIG. 6B. FIG. 6B is a schematic diagram of a transport block including scheduling information indication field information and scheduling information in a data transmission method according to the present disclosure. Referring to FIG. 6B, the first Y bits of a transport block, for example, a downlink shared channel (DL-SCH), are the scheduling information indication field information, and X bits adjacent to the Y bits are the scheduling information. Y is equal to 1 or another value. When the scheduling information is not needed, the network device may configure the scheduling information indication field information to indicate that the scheduling information is not included, so as to release a resource occupied by the scheduling information.

In the foregoing embodiment, joint coding is performed on all information in the transport block carrying the scheduling information. To be specific, joint coding is performed on both the scheduling information and DL-SCH data information, or joint coding is performed on all of the scheduling information indication information, the scheduling information, and DL-SCH data information. Once the first terminal device successfully performs CRC check, it is considered that the scheduling information and data information that is in the transport block are successfully received.

Figure 7:
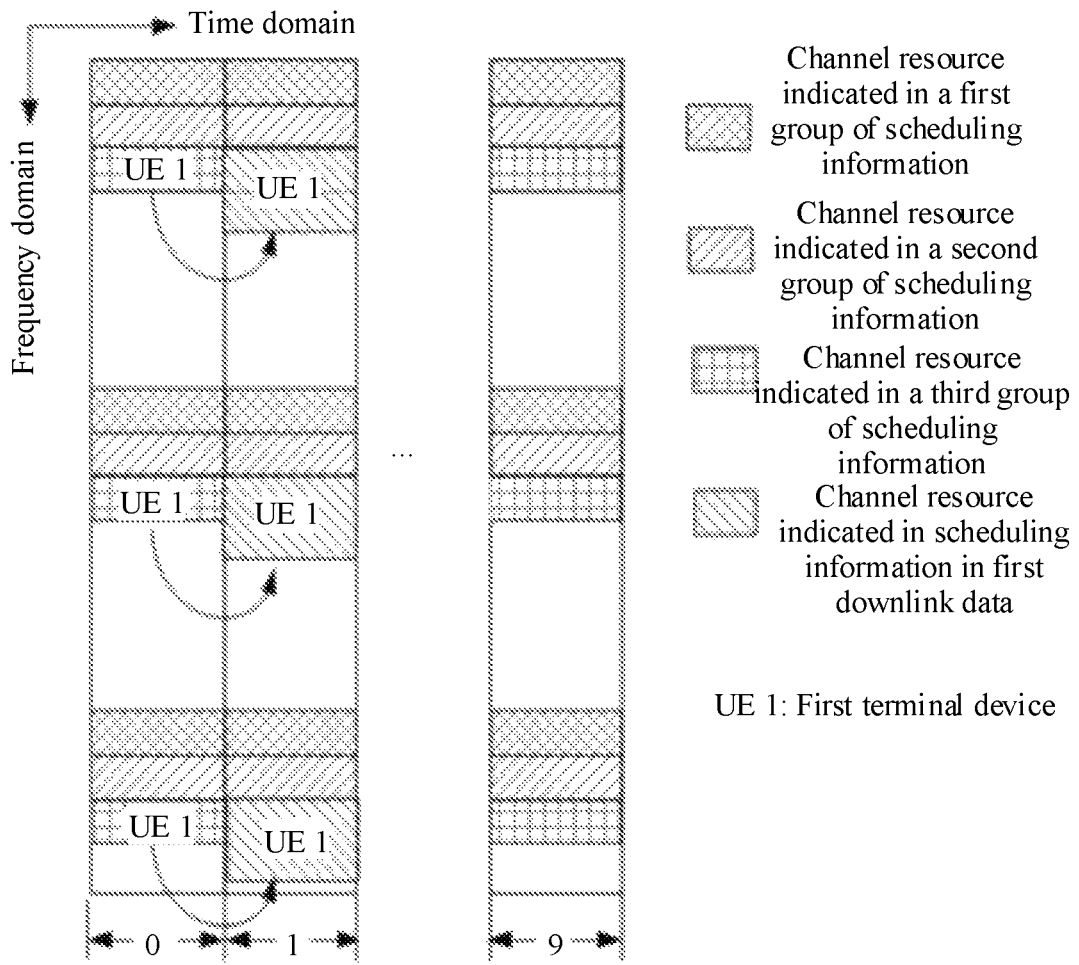
FIG. 7 is a schematic example diagram of a channel resource indicated in scheduling information in first downlink data in a data transmission method according to the present disclosure.

In the foregoing embodiment, the scheduling information included in the first downlink data is used to subsequently transmit downlink data. To be specific, the network device configures and sends the second downlink data based on the scheduling information. For details, refer to FIG. 7. FIG. 7 is a schematic example diagram of a channel resource indicated in scheduling information in first downlink data in a data transmission method according to the present disclosure.

Referring to FIG. 7, in a first transmission time unit 0, the first terminal device receives first downlink data that is sent by the network device on a channel resource indicated in a third group of scheduling information. A transport block included in the first downlink data includes scheduling information, and a channel resource indicated in the scheduling information is located in a second transmission time unit 1.

Figure 8:
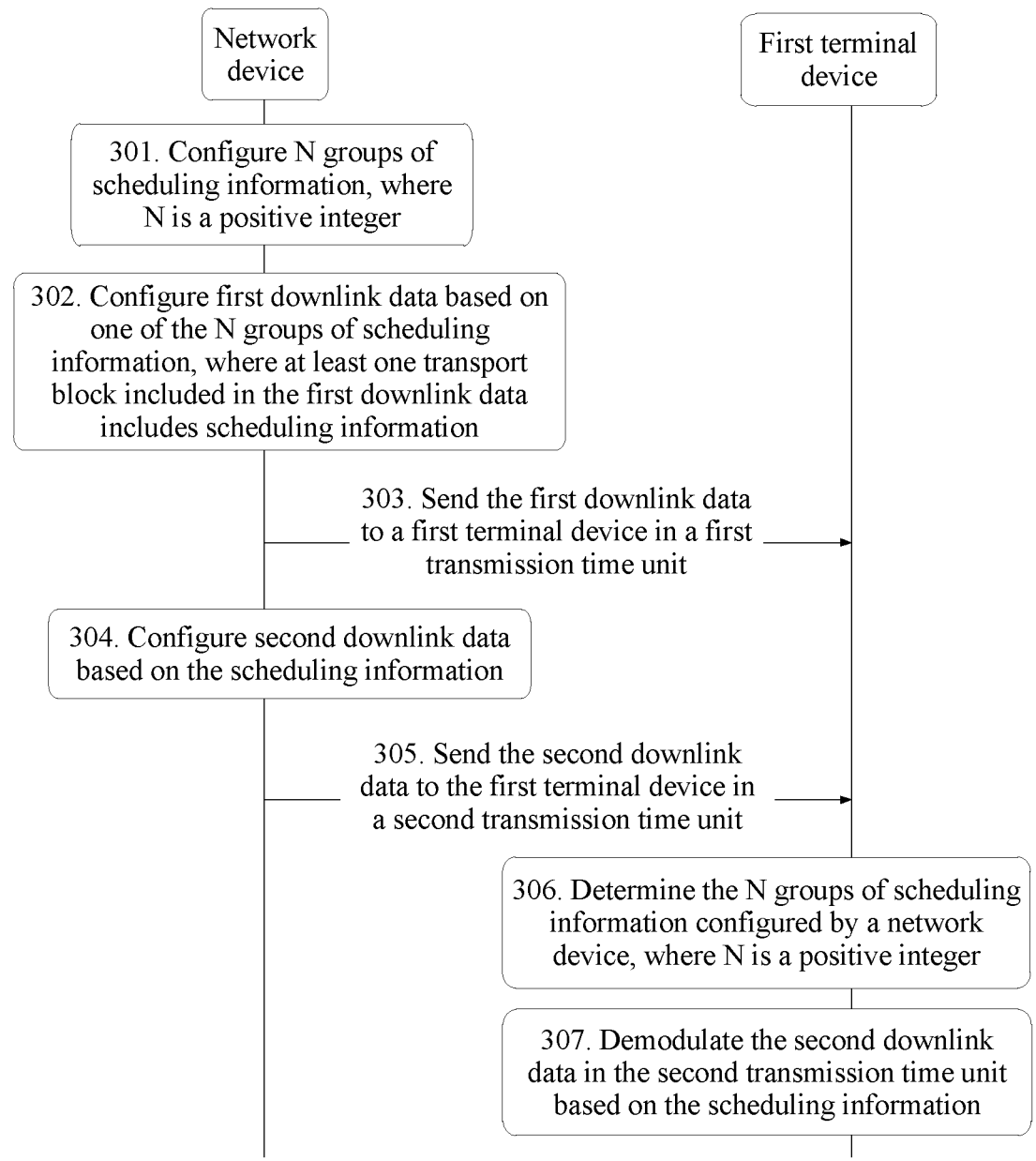
FIG. 8 is a signaling diagram of Embodiment 3 of a data transmission method according to the present disclosure.

In addition, in this embodiment of the present disclosure, data may be transmitted by combining the embodiment shown in FIG. 2 and the embodiment shown in FIG. 5. For details, refer to FIG. 8. FIG. 8 is a signaling diagram of Embodiment 3 of a data transmission method according to the present disclosure. The data transmission method includes the following steps.

301. A network device configures N groups of scheduling information, where N is a positive integer.

302. The network device configures the first downlink data based on one of the N groups of scheduling information, where at least one transport block included in the first downlink data includes scheduling information.

303. The network device sends the first downlink data to a first terminal device in a first transmission time unit.

Correspondingly, the first terminal device receives, in the first transmission time unit, the first downlink data configured by the network device based on one of the N groups of scheduling information.

304. The network device configures second downlink data based on the scheduling information.

305. The network device sends the second downlink data to the first terminal device in a second transmission time unit.

306. The first terminal device determines the N groups of scheduling information configured by the network device, where N is a positive integer.

307. The first terminal device demodulates the second downlink data in the second transmission time unit based on the scheduling information.

For details of step 301 and step 306, refer to step 101 and step 104. Details are not described herein again.

Figure 9:
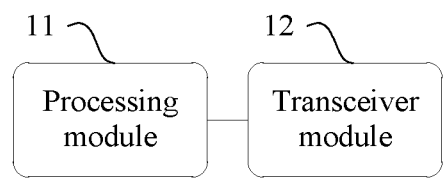
FIG. 9 is a schematic structural diagram of Embodiment 1 of a network device according to the present disclosure.

FIG. 9 is a schematic structural diagram of Embodiment 1 of a network device according to the present disclosure. The network device provided in this embodiment may implement the steps of the method that is applied to the network device and that is provided in FIG. 2 and the optional embodiments in the present disclosure. A specific implementation process is not described herein again. Specifically, the network device provided in this embodiment includes:

a processing module 11, configured to: configure N groups of scheduling information, where N is a positive integer; and configure first downlink data based on M groups of scheduling information in the N groups of scheduling information, where the first downlink data includes at least one piece of downlink data, M is a positive integer less than or equal to N; and a transceiver module 12, configured to send the first downlink data to the first terminal device in a first transmission time unit.

The network device provided in this embodiment of the present disclosure configures the N groups of scheduling information based on a requirement of a terminal device group, configures the at least one piece of downlink data based on the M groups of scheduling information in the N groups of scheduling information, and sends the first downlink data to the first terminal device in the first transmission time unit. Correspondingly, the first terminal device determines the N groups of scheduling information, and detects the first downlink data in the first transmission time unit based on the N groups of scheduling information. In the process, the first downlink data includes the at least one piece of downlink data, and the at least one piece of downlink data carries same information. Therefore, as long as the first terminal device successfully detects one piece of downlink data from the first downlink data, it indicates that the data is successfully received. In this way, the first downlink data can be successfully transmitted through a plurality of transmissions and one successful detection, thereby implementing highly reliable data transmission. In addition, not only low reliability of PDCCH dynamic scheduling is avoided without introducing a large quantity of control overheads, but also link adaptation can be obtained.

Optionally, in an embodiment of the present disclosure, the first downlink data includes M pieces of downlink data, the M pieces of downlink data carry same information, and when configuring the first downlink data based on the M groups of scheduling information in the N groups of scheduling information, the processing module 11 specifically and separately modulates the M pieces of downlink data based on M modulation and coding schemes MCSs indicated in the M groups of scheduling information; and/or respectively maps the M pieces of downlink data onto M channel resources indicated in the M groups of scheduling information.

Optionally, in an embodiment of the present disclosure, the M groups of scheduling information include an $i^{th}$ group of scheduling information in the N groups of scheduling information, and the $i^{th}$ group of scheduling information indicates $S_i$ channel resources, or the $i^{th}$ group of scheduling information indicates $S_i$ channel resources and $S_i$ MCSs, or the $i^{th}$ group of scheduling information indicates $S_i$ channel resources, $S_i$ MCSs, and $S_i$ redundancy versions RVs.

$S_i$ is an integer greater than 1.

Optionally, in an embodiment of the present disclosure, the first downlink data includes $S_i$ pieces of downlink data, and the processing module 11 specifically configures the $S_i$ pieces of downlink data based on the $i^{th}$ group of scheduling information when configuring the first downlink data based on the M groups of scheduling information in the N groups of scheduling information, where the $S_i$ pieces of downlink data carry same information.

Optionally, in an embodiment of the present disclosure, the first downlink data further includes $S_j$ pieces of downlink data, the M groups of scheduling information include a $j^{th}$ group of scheduling information in the N groups of scheduling information, the $j^{th}$ group of scheduling information and the $i^{th}$ group of scheduling information are different scheduling information, and the processing module 11 specifically configures the $S_j$ pieces of downlink data based on the $j^{th}$ group of scheduling information when configuring the first downlink data based on the M groups of scheduling information in the N groups of scheduling information, where the $S_j$ pieces of downlink data carry same information.

The information carried in the $S_j$ pieces of downlink data is different from the information carried in the $S_j$ pieces of downlink data, and $S_j$ is a positive integer.

Optionally, in an embodiment of the present disclosure, the processing module 11 is further configured to configure second downlink data based on P groups of scheduling information in the N groups of scheduling information, where P is a positive integer less than or equal to N.

The transceiver module 12 is further configured to send the second downlink data to a second terminal device in a second transmission time unit.

Optionally, in an embodiment of the present disclosure, the first transmission time unit does not overlap the second transmission time unit, and the M groups of scheduling information are the same as, partially the same as, or different from the P groups of scheduling information; or the first transmission time unit overlaps or partially overlaps the second transmission time unit, and the M groups of scheduling information are different from the P groups of scheduling information.

Optionally, in an embodiment of the present disclosure, the transceiver module 12 is further configured to send scheduling information indication signaling to the first terminal device and/or the second terminal device before sending the first downlink data to the first terminal device in the first transmission time unit, where the scheduling information indication signaling is used to indicate the N groups of scheduling information, and the scheduling information indication signaling is higher layer signaling or physical layer signaling.

Optionally, in an embodiment of the present disclosure, the transceiver module 12 is further configured to send downlink data indication signaling to the first terminal device in the first transmission time unit, where the downlink data indication signaling is used to indicate whether the first downlink data is sent within the first transmission time.

Figure 10:
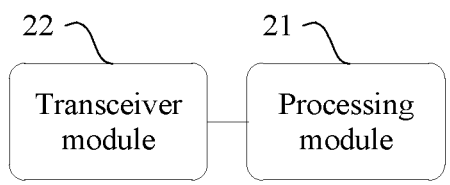
FIG. 10 is a schematic structural diagram of Embodiment 1 of a terminal device according to the present disclosure.

FIG. 10 is a schematic structural diagram of Embodiment 1 of a terminal device according to the present disclosure. The terminal device provided in this embodiment may implement the steps of the method that is applied to the terminal device and that is provided in FIG. 2 and the optional embodiments in the present disclosure. A specific implementation process is not described herein again. Specifically, the terminal device provided in this embodiment includes:

a processing module 21, configured to: determine N groups of scheduling information, where N is a positive integer; and detect first downlink data in a first transmission time unit based on the N groups of scheduling information, where the first downlink data includes at least one piece of downlink data.

The terminal device provided in this embodiment of the present disclosure is specifically a first terminal device. A network device configures the N groups of scheduling information based on a requirement of a terminal device group, configures the at least one piece of downlink data based on M groups of scheduling information in the N groups of scheduling information, and sends the first downlink data to the first terminal device in the first transmission time unit. Correspondingly, the first terminal device determines the N groups of scheduling information, and detects the first downlink data in the first transmission time unit based on the N groups of scheduling information. In the process, the first downlink data includes the at least one piece of downlink data, and the at least one piece of downlink data carries same information. Therefore, as long as the first terminal device successfully detects one piece of downlink data from the first downlink data, it indicates that the data is successfully received. In this way, the first downlink data can be successfully transmitted through a plurality of transmissions and one successful detection, thereby implementing highly reliable data transmission. In addition, not only low reliability of PDCCH dynamic scheduling is avoided without introducing a large quantity of control overheads, but also link adaptation can be obtained.

Optionally, in an embodiment of the present disclosure, the first downlink data is configured by the network device based on M groups of scheduling information in the N groups of scheduling information, M is a positive integer less than or equal to N.

Optionally, in an embodiment of the present disclosure, the first downlink data includes M pieces of downlink data, the M pieces of downlink data carry same information, and when detecting the first downlink data in the first transmission time unit based on the N groups of scheduling information, the processing module 21 is specifically configured to extract, in the first transmission time unit, the M pieces of downlink data from M channel resources indicated in the M groups of scheduling information; and/or the processing module 21 is specifically configured to: when detecting the first downlink data in the first transmission time unit based on the N groups of scheduling information, demodulate the M pieces of downlink data in the first transmission time unit based on M MCSs indicated in the M groups of scheduling information.

Optionally, in an embodiment of the present disclosure, the M groups of scheduling information include an $i^{th}$ group of scheduling information in the N groups of scheduling information, and the $i^{th}$ group of scheduling information indicates $S_i$ channel resources, or the $i^{th}$ group of scheduling information indicates $S_i$ channel resources and $S_i$ MCSs, or the $i^{th}$ group of scheduling information indicates $S_i$ channel resources, $S_i$ MCSs, and $S_i$ redundancy versions RVs.

$S_i$ is an integer greater than 1.

Optionally, in an embodiment of the present disclosure, the first downlink data includes $S_i$ pieces of downlink data, and the processing module 21 is specifically configured to detect the $S_i$ pieces of downlink data based on the $i^{th}$ group of scheduling information when detecting the first downlink data in the first transmission time unit based on the N groups of scheduling information, where the $S_i$ pieces of downlink data carry same information.

Optionally, in an embodiment of the present disclosure, the first downlink data further includes $S_j$ pieces of downlink data, the M groups of scheduling information include a $j^{th}$ group of scheduling information in the N groups of scheduling information, the $j^{th}$ group of scheduling information and the $i^{th}$ group of scheduling information are different scheduling information, and the processing module 21 is specifically configured to detect the $S_j$ pieces of downlink data based on the $j^{th}$ group of scheduling information, where the $S_j$ pieces of downlink data carry same information.

The information carried in the $S_j$ pieces of downlink data is different from the information carried in the $S_i$ pieces of downlink data, and $S_j$ is a positive integer.

Referring to FIG. 10, the terminal device provided in this embodiment of the present disclosure further includes:

a transceiver module 22, configured to: before the processing module 21 detects the first downlink data in the first transmission time unit based on the N groups of scheduling information, receive scheduling information indication signaling sent by the network device, where the scheduling information indication signaling is used to indicate the N groups of scheduling information, and the scheduling information indication signaling is higher layer signaling or physical layer signaling.

Optionally, in an embodiment of the present disclosure, the transceiver module 22 is configured to: before the processing module 21 detects the first downlink data in the first transmission time unit based on the N groups of scheduling information, receive downlink data indication signaling that is sent by the network device in the first transmission time unit, where the downlink data indication signaling is used to indicate whether the first downlink data is sent within the first transmission time.

Figure 11:
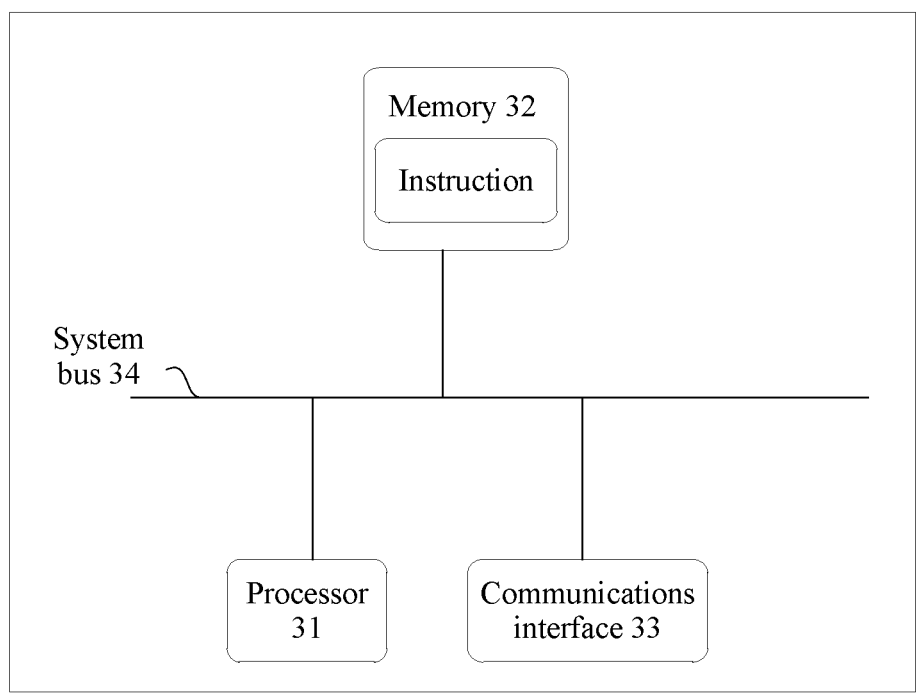
FIG. 11 is a schematic structural diagram of Embodiment 2 of a network device according to the present disclosure.

FIG. 11 is a schematic structural diagram of Embodiment 2 of a network device according to the present disclosure. The network device provided in this embodiment includes a processor 31, a memory 32, a communications interface 33, and a system bus 34. The memory 32, the communications interface 33, and the processor 31 are connected to and communicate with each other by using the system bus 34. The memory 32 is configured to store a computer execution instruction, the communications interface 33 is configured to communicate with another device, and the processor 31 is configured to run the computer execution instruction, so that the network device performs the steps applied to FIG. 2 or the optional embodiments.

Figure 12:
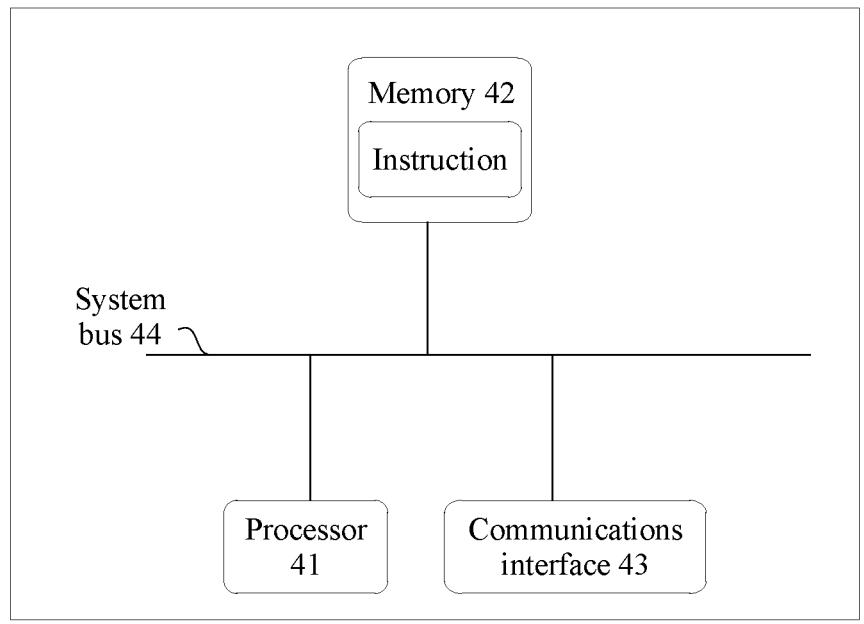
FIG. 12 is a schematic structural diagram of Embodiment 2 of a terminal device according to the present disclosure.

FIG. 12 is a schematic structural diagram of Embodiment 2 of a terminal device according to the present disclosure. The terminal device provided in this embodiment includes a processor 41, a memory 42, a communications interface 43, and a system bus 44. The memory 42, the communications interface 43, and the processor 41 are connected to and communicate with each other by using the system bus 44. The memory 42 is configured to store a computer execution instruction, the communications interface 43 is configured to communicate with another device, and the processor 41 is configured to run the computer execution instruction, so that the terminal device performs the steps applied to FIG. 2 or the optional embodiments.

Figure 13:
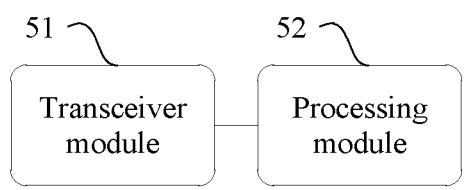
FIG. 13 is a schematic structural diagram of Embodiment 3 of a network device according to the present disclosure.

FIG. 13 is a schematic structural diagram of Embodiment 3 of a network device according to the present disclosure. The network device provided in this embodiment may implement the steps of the method that is applied to the network device and that is provided in FIG. 5 and the optional embodiments in the present disclosure. A specific implementation process is not described herein again. Specifically, the network device provided in this embodiment includes:

a transceiver module 51, configured to send first downlink data to a first terminal device in a first transmission time unit, where at least one transport block included in the first downlink data includes scheduling information; and a processing module 52, configured to configure second downlink data based on the scheduling information.

The transceiver module 51 is further configured to send the second downlink data to the first terminal device in a second transmission time unit.

The first transmission time unit is earlier than the second transmission time unit.

The network device provided in this embodiment of the present disclosure sends the first downlink data to the first terminal device in the first transmission time unit, where the at least one transport block included in the first downlink data includes the scheduling information; configures the second downlink data based on the scheduling information; and sends the second downlink data to the first terminal in the second transmission time unit. Correspondingly, the first terminal device demodulates the received second downlink data in the second transmission time unit. In the process, the network device first sends the scheduling information to the first terminal device, and then sends the downlink data configured based on the scheduling information to the first terminal device, so that the first terminal device can detect the downlink data based on the scheduling information, thereby implementing highly reliable data transmission. In addition, not only low reliability of PDCCH dynamic scheduling is avoided without introducing a large quantity of control overheads, but also link adaptation can be obtained.

Optionally, in an embodiment of the present disclosure, the first downlink data includes A transport blocks, and the scheduling information occupies the first X bits or the last X bits of one of the A transport blocks; or the first downlink data includes two transport blocks, and the scheduling information occupies the first X bits or the last X bits of each of the two transport blocks.

X is an integer greater than or equal to 1, and A is equal to 1 or 2.

Optionally, in an embodiment of the present disclosure, the transport block further includes scheduling information indication field information.

The first downlink data includes A transport blocks, the scheduling information indication field information occupies the first Y bits of one of the A transport blocks, and the scheduling information occupies X bits after the Y bits of the transport block; or the first downlink data includes two transport blocks, the scheduling information indication field information occupies the first Y bits of each of the two transport blocks, and the scheduling information occupies X bits after the Y bits of each of the two transport blocks.

X is an integer greater than or equal to 1, and A is equal to 1 or 2.

Optionally, in an embodiment of the present disclosure, joint coding is performed on all information in the transport block.

Optionally, in an embodiment of the present disclosure, the processing module 52 is further configured to: configure N groups of scheduling information before the transceiver module 51 sends the first downlink data to the first terminal device in the first transmission time unit, where N is a positive integer; and configure the first downlink data based on one of the N groups of scheduling information.

Figure 14:
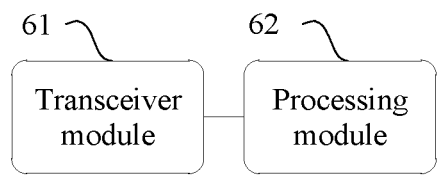
FIG. 14 is a schematic structural diagram of Embodiment 3 of a terminal device according to the present disclosure.

FIG. 14 is a schematic structural diagram of Embodiment 3 of a terminal device according to the present disclosure. The terminal device provided in this embodiment may implement the steps of the method that is applied to the terminal device and that is provided in FIG. 5 and the optional embodiments in the present disclosure. A specific implementation process is not described herein again. Specifically, the terminal device provided in this embodiment includes:

a transceiver module 61, configured to receive first downlink data that is sent by a network device in a first transmission time unit, where at least one transport block included in the first downlink data includes scheduling information; and a processing module 62, configured to demodulate second downlink data in a second transmission time unit based on the scheduling information, where the second downlink data is configured by the network device based on the scheduling information.

The first transmission time unit is earlier than the second transmission time unit.

The terminal device provided in this embodiment of the present disclosure receives the first downlink data that is sent by the network device in the first transmission time unit, where the at least one transport block included in the first downlink data includes the scheduling information; and receives and demodulates the second downlink data that is sent by the network device in the second transmission time unit. In the process, the network device first sends the scheduling information to the first terminal device, and then sends the downlink data configured based on the scheduling information to the first terminal device, so that the first terminal device can detect the downlink data based on the scheduling information, thereby implementing highly reliable data transmission. In addition, not only low reliability of PDCCH dynamic scheduling is avoided without introducing a large quantity of control overheads, but also link adaptation can be obtained.

Optionally, in an embodiment of the present disclosure, the first downlink data includes A transport blocks, and the scheduling information occupies the first X bits or the last X bits of one of the A transport blocks; or the first downlink data includes two transport blocks, and the scheduling information occupies the first X bits or the last X bits of each of the two transport blocks.

X is an integer greater than or equal to 1, and A is equal to 1 or 2.

Optionally, in an embodiment of the present disclosure, the first downlink data includes A transport blocks, the scheduling information indication field information occupies the first Y bits of one of the A transport blocks, and the scheduling information occupies X bits after the Y bits of the transport block; or the first downlink data includes two transport blocks, the scheduling information indication field information occupies the first Y bits of each of the two transport blocks, and the scheduling information occupies X bits after the Y bits of each of the two transport blocks.

X is an integer greater than or equal to 1, and A is equal to 1 or 2.

Optionally, in an embodiment of the present disclosure, joint coding is performed on all information in the transport block.

Optionally, in an embodiment of the present disclosure, the transceiver module 61 is specifically configured to receive, in the first transmission time unit, the first downlink data configured by the network device based on one of N groups of scheduling information.

Figure 15:
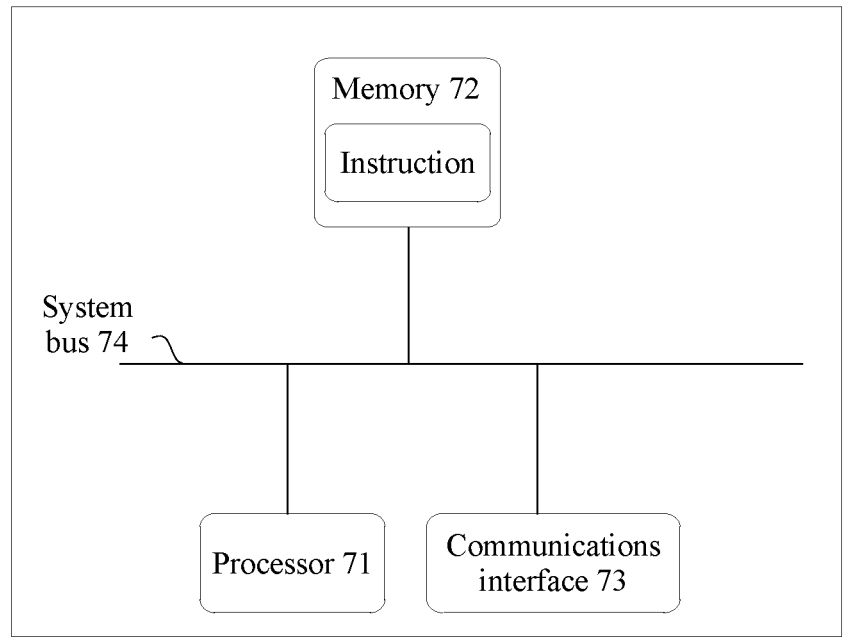
FIG. 15 is a schematic structural diagram of Embodiment 4 of a network device according to the present disclosure.

FIG. 15 is a schematic structural diagram of Embodiment 4 of a network device according to the present disclosure. The network device provided in this embodiment includes a processor 71, a memory 72, a communications interface 73, and a system bus 74. The memory 72, the communications interface 73, the processor 71 are connected to and communicate with each other by using the system bus 74. The memory 72 is configured to store a computer execution instruction, the communications interface 73 is configured to communicate with another device, and the processor 71 is configured to run the computer execution instruction, so that the network device performs the steps applied to FIG. 5 or the optional embodiments.

Figure 16:
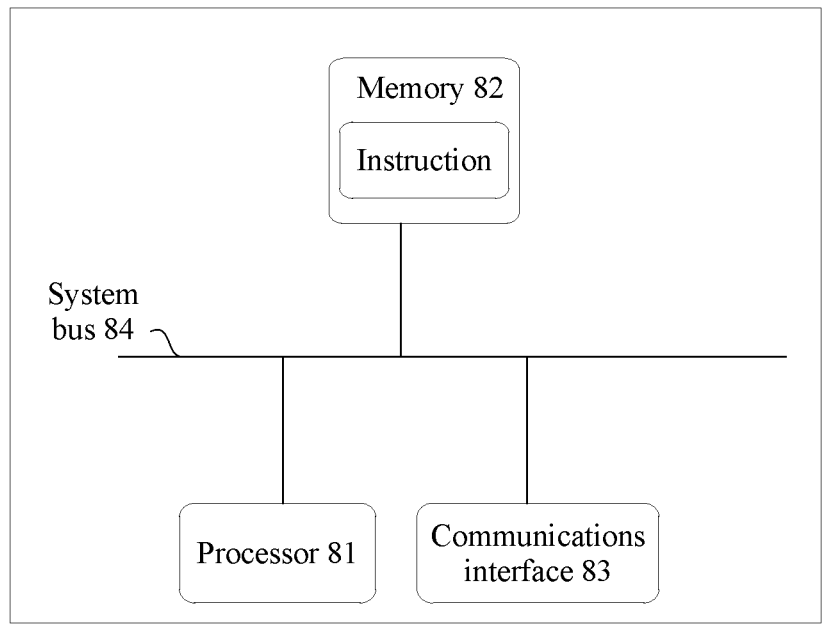
FIG. 16 is a schematic structural diagram of Embodiment 4 of a terminal device according to the present disclosure.

FIG. 16 is a schematic structural diagram of Embodiment 4 of a terminal device according to the present disclosure. The terminal device provided in this embodiment includes a processor 81, a memory 82, a communications interface 83, and a system bus 84. The memory 82, the communications interface 83, the processor 81 are connected to and communicate with each other by using the system bus 84. The memory 82 is configured to store a computer execution instruction, the communications interface 83 is configured to communicate with another device, and the processor 81 is configured to run the computer execution instruction, so that the terminal device performs the steps applied to FIG. 5 or the optional embodiments.

Persons of ordinary skill in the art may understand that all or some of the steps of the method embodiments may be implemented by a program instructing related hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A data transmission method, comprising:
configuring, by a network device, N groups of scheduling information, wherein N is a positive integer;
configuring, by the network device, first downlink data based on M groups of scheduling information in the N groups of scheduling information, including:
separately modulating, by the network device, M pieces of downlink data based on M modulation and coding schemes (MCSs) indicated in the M groups of scheduling information, and/or
respectively mapping, by the network device, the M pieces of downlink data onto M channel resources indicated in the M groups of scheduling information, wherein M is a positive integer less than or equal to N; and
sending, by the network device, the first downlink data to a first terminal device in a first transmission time unit, wherein the first downlink data comprises the M pieces of downlink data, the M pieces of downlink data carry same information.

2. The method according to claim 1, wherein:
the M groups of scheduling information comprise an $i^{th}$ group of scheduling information in the N groups of scheduling information; and
the $i^{th}$ group of scheduling information indicates:
$S_i$ channel resources, or
$S_i$ channel resources and $S_i$ modulation and coding schemes (MCSs), or
$S_i$ channel resources, $S_i$ MCSs and $S_i$ redundancy versions (RVs), and
wherein $S_i$ is an integer greater than 1.

3. The method according to claim 2, wherein:
the first downlink data comprises $S_i$ pieces of downlink data; and
configuring, by the network device, first downlink data based on M groups of scheduling information in the N groups of scheduling information comprises:
configuring, by the network device, the $S_i$ pieces of downlink data based on the $i^{th}$ group of scheduling information, wherein the $S_i$ pieces of downlink data carry same information.

4. The method according to claim 3, wherein:
the first downlink data further comprises $S_j$ pieces of downlink data;
the M groups of scheduling information comprise a $j^{th}$ group of scheduling information in the N groups of scheduling information;
the $j^{th}$ group of scheduling information and the $i^{th}$ group of scheduling information are different scheduling information; and
configuring, by the network device, first downlink data based on M groups of scheduling information in the N groups of scheduling information comprises:
configuring, by the network device, the $S_j$ pieces of downlink data based on the $j^{th}$ group of scheduling information, wherein the $S_j$ pieces of downlink data carry same information, and wherein the information carried in the $S_j$ pieces of downlink data is different from the information carried in the $S_i$ pieces of downlink data, and $S_j$ is a positive integer.

5. The method according to claim 1, further comprising:
configuring, by the network device, second downlink data based on P groups of scheduling information in the N groups of scheduling information, wherein P is a positive integer less than or equal to N; and
sending, by the network device, the second downlink data to a second terminal device in a second transmission time unit.

6. The method according to claim 5, wherein:
the first transmission time unit does not overlap the second transmission time unit, and the M groups of scheduling information are the same as, partially the same as, or different from the P groups of scheduling information; or
the first transmission time unit overlaps or partially overlaps the second transmission time unit, and the M groups of scheduling information are different from the P groups of scheduling information.

7. The method according to claim 1, wherein before sending, by the network device, the first downlink data to the first terminal device in a first transmission time unit, the method further comprises:
sending, by the network device, scheduling information indication signaling to the first terminal device and/or a second terminal device for indicating the N groups of scheduling information, and wherein the scheduling information indication signaling is higher layer signaling or physical layer signaling.

8. The method according to claim 1, further comprising:
sending, by the network device, downlink data indication signaling to the first terminal device in the first transmission time unit for indicating whether the first downlink data is sent within the first transmission time unit.

9. A data transmission method, comprising:
determining, by a first terminal device, N groups of scheduling information, wherein N is a positive integer; and
detecting, by the first terminal device, first downlink data in a first transmission time unit based on the N groups of scheduling information, including:
extracting, by the first terminal device in the first transmission time unit, M pieces of downlink data from M channel resources indicated in M groups of the N groups of scheduling information; and/or
demodulating, by the first terminal device, the M pieces of downlink data in the first transmission time unit based on M modulation and coding schemes (MCSs) indicated in the M groups of scheduling information, wherein the first downlink data comprises the M pieces of downlink data, and the M pieces of downlink data carry same information.

10. The method according to claim 9, wherein the first downlink data is configured by a network device based on the M groups of scheduling information in the N groups of scheduling information, and M is a positive integer less than or equal to N.

11. The method according to claim 10, wherein:
the M groups of scheduling information comprise an $i^{th}$ group of scheduling information in the N groups of scheduling information; and
the $i^{th}$ group of scheduling information indicates:
$S_i$ channel resources, or
$S_i$ channel resources and $S_i$ M modulation and coding schemes (MCSs), or
$S_i$ channel resources, $S_i$ MCSs and $S_i$ redundancy versions (RVs), and
wherein $S_i$ is an integer greater than 1.

12. The method according to claim 11, wherein:
the first downlink data comprises $S_i$ pieces of downlink data; and
detecting, by the first terminal device, first downlink data in a first transmission time unit based on the N groups of scheduling information comprises:
  detecting, by the first terminal device, the $S_i$ pieces of downlink data based on the $i^{th}$ group of scheduling information, wherein the $S_i$ pieces of downlink data carry same information.

13. The method according to claim 12, wherein:
the first downlink data further comprises $S_j$ pieces of downlink data;
the M groups of scheduling information comprise a $j^{th}$ group of scheduling information in the N groups of scheduling information;
the $j^{th}$ group of scheduling information and the $i^{th}$ group of scheduling information are different scheduling information; and
detecting, by the first terminal device, first downlink data in a first transmission time unit based on the N groups of scheduling information comprises:
  detecting, by the first terminal device, the $S_j$ pieces of downlink data based on the $j^{th}$ group of scheduling information, wherein the $S_j$ pieces of downlink data carry same information, and wherein the information carried in the $S_j$ pieces of downlink data is different from the information carried in the $S_i$ pieces of downlink data, and $S_j$ is a positive integer.

14. The method according to claim 9, wherein before detecting, by the first terminal device, first downlink data in a first transmission time unit based on the N groups of scheduling information, the method further comprises:
  receiving, by the first terminal device, scheduling information indication signaling sent by a network device for indicating the N groups of scheduling information, and the scheduling information indication signaling is higher layer signaling or physical layer signaling.

15. The method according to claim 9, wherein before detecting, by the first terminal device, first downlink data in a first transmission time unit based on the N groups of scheduling information, the method further comprises:
  receiving, by the first terminal device, downlink data indication signaling that is sent by a network device in the first transmission time unit for indicating whether the first downlink data is sent within the first transmission time unit.

16. A network device, comprising:
a processor configured to:
  configure N groups of scheduling information, wherein N is a positive integer, and
  configure first downlink data based on M groups of scheduling information in the N groups of scheduling information, including:
    separately modulate M pieces of downlink data based on M modulation and coding schemes (MCSs) indicated in M groups of the N groups of scheduling information, and/or
    respectively maps the M pieces of downlink data onto M channel resources indicated in the M groups of scheduling information, wherein M is a positive integer less than or equal to N; and
a transceiver configured to send the first downlink data to a first terminal device in a first transmission time unit, wherein the first downlink data comprises the M pieces of downlink data, and the M pieces of downlink data carry same information.

17. The network device according to claim 16, wherein:
the M groups of scheduling information comprise an $i^{th}$ group of scheduling information in the N groups of scheduling information; and
the $i^{th}$ group of scheduling information indicates:
  $S_i$ channel resources, or
  $S_i$ channel resources and $S_i$ MCSs, or
  $S_i$ channel resources, $S_i$ MCSs and $S_i$ redundancy versions (RVs), and
  wherein $S_i$ is an integer greater than 1.

* * * * *